(12) United States Patent
Manley et al.

(10) Patent No.: US 8,750,468 B2
(45) Date of Patent: Jun. 10, 2014

(54) CONTEXTUALIZED TELEPHONY MESSAGE MANAGEMENT

(75) Inventors: Richard J. Manley, Austin, TX (US);
Craig Fryar, Cedar Park, TX (US);
Michael Lee, Cedar Park, TX (US);
Carmichael J. Simon, Cedar Park, TX (US); William C. Archibald, Austin, TX (US)

(73) Assignee: CallSpace, Inc., Austin, TX (US)

( * ) Notice: Subject to any disclaimer, the term of this patent is extended or adjusted under 35 U.S.C. 154(b) by 311 days.

(21) Appl. No.: 12/898,606

(22) Filed: Oct. 5, 2010

(65) Prior Publication Data

US 2011/0123011 A1    May 26, 2011

Related U.S. Application Data

(60) Provisional application No. 61/248,593, filed on Oct. 5, 2009.

(51) Int. Cl.
*H04M 1/64* (2006.01)

(52) U.S. Cl.
USPC .............. 379/88.19; 379/88.23; 455/414.3

(58) Field of Classification Search
USPC ............. 379/201.01, 88.19, 88.23; 455/414.3
See application file for complete search history.

(56) References Cited

U.S. PATENT DOCUMENTS

| | | | |
|---|---|---|---|
| 4,706,080 A | 11/1987 | Sincoskie | |
| 5,155,591 A | 10/1992 | Wachob | |
| 5,245,656 A | 9/1993 | Loeb et al. | |
| 5,301,109 A | 4/1994 | Landauer et al. | |
| 5,319,455 A | 6/1994 | Hoarty et al. | |
| 5,321,740 A | 6/1994 | Gregorek et al. | |
| 5,321,833 A | 6/1994 | Chang et al. | |
| 5,331,554 A | 7/1994 | Graham | |
| 5,331,556 A | 7/1994 | Black, Jr. et al. | |

(Continued)

FOREIGN PATENT DOCUMENTS

| | | |
|---|---|---|
| EP | 1701527 A1 | 9/2006 |
| WO | 03032226 A1 | 4/2003 |
| WO | 2006035267 A1 | 4/2006 |

OTHER PUBLICATIONS

"Scatter/Gather: A Cluster-based Approach to Browsing Large Document Collections" by Cutting et al., 15th Ann Int'l Sigir '92, ACM 318-329.

(Continued)

*Primary Examiner* — Creighton Smith
(74) *Attorney, Agent, or Firm* — Yudell Isidore Ng Russell PLLC

(57) ABSTRACT

In one or more embodiments, one or more methods and/or systems described can transform an inbound call into one or more call streams and/or call states that can include at least one of a contextualized or personalized message, a promotion, a coupon, an offer, a voucher, an advertisement, and an opt-in program, among others. For example, the one or more methods and/or systems described can perform: receiving identification information associated with a telephony device; determining, based on the identification information, a message for the user; and sending the message to the telephony device. For instance, the message can include a coupon or discount for a good or service. In one example, the coupon or discount can be sent via a short message service text message. In another example, the coupon or discount can include a computer-readable image that can be sent via a multimedia messaging service message.

31 Claims, 12 Drawing Sheets

(56) References Cited

U.S. PATENT DOCUMENTS

| | | |
|---|---|---|
| 5,404,566 A | 4/1995 | Wehrmeyer |
| 5,410,344 A | 4/1995 | Graves et al. |
| 5,469,206 A | 11/1995 | Strubbe et al. |
| 5,483,278 A | 1/1996 | Strubbe et al. |
| 5,491,838 A | 2/1996 | Takahisa et al. |
| 5,502,636 A | 3/1996 | Clarke |
| 5,515,098 A | 5/1996 | Carles |
| 5,557,658 A | 9/1996 | Gregorek et al. |
| 5,572,442 A | 11/1996 | Schulhof et al. |
| 5,572,644 A | 11/1996 | Liaw et al. |
| 5,619,554 A | 4/1997 | Hogan et al. |
| 5,630,060 A | 5/1997 | Tang et al. |
| 5,636,346 A | 6/1997 | Saxe |
| 5,649,114 A | 7/1997 | Deaton et al. |
| 5,652,615 A | 7/1997 | Bryant et al. |
| 5,661,516 A | 8/1997 | Carles |
| 5,717,923 A | 2/1998 | Dedrick |
| 5,721,827 A | 2/1998 | Logan et al. |
| 5,724,521 A | 3/1998 | Dedrick |
| 5,724,567 A | 3/1998 | Rose et al. |
| 5,726,909 A | 3/1998 | Krikorian |
| 5,734,119 A | 3/1998 | France et al. |
| 5,751,806 A | 5/1998 | Ryan |
| 5,754,939 A | 5/1998 | Herz et al. |
| 5,758,257 A | 5/1998 | Herz et al. |
| 5,758,351 A | 5/1998 | Gibson et al. |
| 5,761,601 A | 6/1998 | Nemirofsky et al. |
| 5,781,615 A | 7/1998 | Bales et al. |
| 5,787,151 A | 7/1998 | Nakatsu et al. |
| 5,793,980 A | 8/1998 | Glaser et al. |
| 5,799,063 A | 8/1998 | Krane |
| 5,832,457 A | 11/1998 | O'Brien et al. |
| 5,872,926 A | 2/1999 | Levac et al. |
| 5,905,775 A | 5/1999 | Polcyn |
| 5,915,238 A | 6/1999 | Tjaden |
| 5,926,789 A | 7/1999 | Barbara et al. |
| 5,940,818 A | 8/1999 | Malloy et al. |
| 5,943,677 A | 8/1999 | Hicks |
| 5,953,394 A | 9/1999 | Asakawa |
| 5,974,406 A | 10/1999 | Bisdikian et al. |
| 5,978,766 A | 11/1999 | Luciw |
| 5,991,735 A | 11/1999 | Gerace |
| 5,996,006 A | 11/1999 | Speicher |
| 6,009,411 A | 12/1999 | Kepecs |
| 6,014,427 A | 1/2000 | Hanson et al. |
| 6,014,428 A | 1/2000 | Wolf |
| 6,029,195 A | 2/2000 | Herz |
| 6,038,591 A | 3/2000 | Wolfe et al. |
| 6,044,376 A | 3/2000 | Kurtzman, II |
| 6,049,778 A | 4/2000 | Walker et al. |
| 6,055,513 A | 4/2000 | Katz et al. |
| 6,067,348 A | 5/2000 | Hibbeler |
| 6,067,525 A | 5/2000 | Johnson et al. |
| 6,122,628 A | 9/2000 | Castelli et al. |
| 6,141,010 A | 10/2000 | Hoyle |
| 6,161,142 A | 12/2000 | Wolfe et al. |
| 6,189,008 B1 | 2/2001 | Easty et al. |
| 6,216,129 B1 | 4/2001 | Eldering |
| 6,247,069 B1 | 6/2001 | Smyers |
| 6,292,844 B1 | 9/2001 | Smyers et al. |
| 6,377,664 B2 | 4/2002 | Gerszberg et al. |
| 6,400,804 B1 | 6/2002 | Bilder |
| 6,408,068 B1 | 6/2002 | Larson et al. |
| 6,411,684 B1 | 6/2002 | Cohn et al. |
| 6,606,596 B1 | 8/2003 | Zirngibl et al. |
| 6,721,398 B1 | 4/2004 | Pitcher |
| 6,721,859 B1 | 4/2004 | Smyers |
| 6,735,297 B1 | 5/2004 | McCormack et al. |
| 6,826,572 B2 | 11/2004 | Colace et al. |
| 6,859,846 B2 | 2/2005 | Swindler et al. |
| 6,892,189 B2 | 5/2005 | Quass et al. |
| 6,907,566 B1 | 6/2005 | McElfresh et al. |
| 6,940,953 B1 | 9/2005 | Eberle et al. |
| 6,964,012 B1 | 11/2005 | Zirngibl et al. |
| 6,977,992 B2 | 12/2005 | Zirngibl et al. |
| 6,993,646 B2 | 1/2006 | Smyers |
| 7,020,251 B2 | 3/2006 | Zirngibl et al. |
| 7,054,857 B2 | 5/2006 | Cunningham et al. |
| 7,065,500 B2 | 6/2006 | Singh et al. |
| 7,068,643 B1 | 6/2006 | Hammond |
| 7,085,755 B2 | 8/2006 | Bluhm et al. |
| 7,085,758 B2 | 8/2006 | Barsness et al. |
| 7,100,111 B2 | 8/2006 | McElfresh et al. |
| 7,103,156 B2 | 9/2006 | Celi, Jr. et al. |
| 7,117,158 B2 | 10/2006 | Weldon et al. |
| 7,124,292 B2 | 10/2006 | Smyers |
| 7,136,478 B1 | 11/2006 | Brand et al. |
| 7,148,795 B2 | 12/2006 | Dilbeck et al. |
| 7,185,065 B1 | 2/2007 | Holtzman et al. |
| 7,194,698 B2 | 3/2007 | Gottfurcht et al. |
| 7,197,130 B2 | 3/2007 | Paden et al. |
| 7,197,461 B1 | 3/2007 | Eberle et al. |
| 7,200,563 B1 | 4/2007 | Hammitt et al. |
| 7,231,358 B2 | 6/2007 | Singh et al. |
| 7,242,751 B2 | 7/2007 | Bushey et al. |
| 7,245,707 B1 | 7/2007 | Chan |
| 7,248,678 B2 | 7/2007 | Adams et al. |
| 7,251,318 B1 | 7/2007 | Henderson |
| 7,266,181 B1 | 9/2007 | Zirngibl et al. |
| 7,272,212 B2 | 9/2007 | Eberle et al. |
| 7,272,214 B2 | 9/2007 | Didcock et al. |
| 7,283,992 B2 | 10/2007 | Liu et al. |
| 7,286,658 B1 | 10/2007 | Henderson |
| 7,302,410 B1 | 11/2007 | Venkatraman et al. |
| 7,305,550 B2 | 12/2007 | Oliver et al. |
| 7,308,088 B1 | 12/2007 | Henderson |
| 7,321,887 B2 | 1/2008 | Dorner et al. |
| 7,340,040 B1 | 3/2008 | Saylor et al. |
| 7,356,615 B2 | 4/2008 | Cai et al. |
| 7,373,599 B2 | 5/2008 | McElfresh et al. |
| 7,379,540 B1 | 5/2008 | Van Gundy |
| 7,424,457 B2 | 9/2008 | Khaishgi et al. |
| 7,454,409 B2 | 11/2008 | Roy et al. |
| 7,603,294 B2 | 10/2009 | Singh et al. |
| 7,668,950 B2 | 2/2010 | Horowitz et al. |
| 7,698,281 B2 | 4/2010 | Cunningham et al. |
| 2003/0161464 A1* | 8/2003 | Rodriguez et al. ........ 379/266.01 |
| 2005/0137939 A1 | 6/2005 | Calabria et al. |
| 2005/0144064 A1 | 6/2005 | Calabria et al. |
| 2005/0144065 A1 | 6/2005 | Calabria et al. |
| 2005/0147227 A1 | 7/2005 | Chervirala et al. |
| 2005/0186947 A1 | 8/2005 | Miller et al. |
| 2005/0187878 A1 | 8/2005 | Khaishgi et al. |
| 2005/0271188 A1 | 12/2005 | Kraft et al. |
| 2006/0047568 A1 | 3/2006 | Eisenberg et al. |
| 2006/0171520 A1 | 8/2006 | Kliger |
| 2006/0173827 A1 | 8/2006 | Kliger |
| 2006/0173915 A1 | 8/2006 | Kliger |
| 2006/0268667 A1* | 11/2006 | Jellison et al. ............ 369/30.08 |
| 2006/0288100 A1 | 12/2006 | Carson et al. |
| 2007/0027756 A1 | 2/2007 | Collins et al. |
| 2007/0027757 A1 | 2/2007 | Collins et al. |
| 2007/0027759 A1 | 2/2007 | Collins et al. |
| 2007/0027761 A1 | 2/2007 | Collins et al. |
| 2007/0027762 A1 | 2/2007 | Collins et al. |
| 2007/0033103 A1 | 2/2007 | Collins et al. |
| 2007/0033104 A1 | 2/2007 | Collins et al. |
| 2007/0067297 A1 | 3/2007 | Kublickis |
| 2007/0192194 A1 | 8/2007 | O'Donnell et al. |
| 2007/0230669 A1 | 10/2007 | Hazenfield |
| 2007/0264987 A1 | 11/2007 | Gupta et al. |
| 2007/0282795 A1 | 12/2007 | Mashinsky |
| 2007/0286362 A1 | 12/2007 | Coleson et al. |
| 2007/0288318 A1 | 12/2007 | Gupta et al. |
| 2007/0299743 A1 | 12/2007 | Staib et al. |
| 2008/0140476 A1 | 6/2008 | Anand et al. |
| 2008/0140508 A1 | 6/2008 | Anand et al. |
| 2008/0140524 A1 | 6/2008 | Anand et al. |
| 2008/0249855 A1 | 10/2008 | Collins et al. |
| 2008/0255937 A1 | 10/2008 | Chang et al. |
| 2008/0256039 A1 | 10/2008 | Chang et al. |
| 2008/0256056 A1 | 10/2008 | Chang et al. |
| 2008/0256059 A1 | 10/2008 | Chang et al. |
| 2008/0256060 A1 | 10/2008 | Chang et al. |

(56) References Cited

U.S. PATENT DOCUMENTS

| | | | |
|---|---|---|---|
| 2008/0256061 A1 | 10/2008 | Chang et al. | |
| 2008/0270223 A1 | 10/2008 | Collins et al. | |
| 2009/0012852 A1 | 1/2009 | O'Kelley et al. | |
| 2009/0022283 A1* | 1/2009 | Pollitt | 379/87 |
| 2009/0164299 A1 | 6/2009 | Gupta et al. | |
| 2009/0197581 A1 | 8/2009 | Gupta et al. | |
| 2009/0198538 A1 | 8/2009 | Gupta et al. | |
| 2009/0311999 A1* | 12/2009 | Sarkar et al. | 455/415 |
| 2009/0313551 A1* | 12/2009 | Gibbon et al. | 715/745 |
| 2011/0282954 A1* | 11/2011 | Flake et al. | 709/206 |
| 2011/0288978 A1* | 11/2011 | Abifaker | 705/35 |
| 2012/0275766 A1* | 11/2012 | Woodward et al. | 386/248 |
| 2012/0276890 A1* | 11/2012 | Raduchel | 455/419 |

OTHER PUBLICATIONS

Callspace, Inc., PCT/US2010/051540, International Search Report, Oct. 5, 2010.

EP Application No. 10 82 2561, Supplementary European Search Report, Jul. 11, 2013.

* cited by examiner

CONTEXTUALIZED TELEPHONY MESSAGE MANAGEMENT

This application claims benefit of U.S. Provisional Application Ser. No. 61/248,593, filed Oct. 5, 2009, titled "Method and Apparatus For Syndicated Streaming Multimedia Messaging Network", which application is hereby incorporated by reference in its entirety as though fully and completely set forth herein.

BACKGROUND

1. Technical Field

This description relates generally to the field of managing calls within a telephony management system, and, more specifically, to dynamically providing call support services within a telephony management system.

2. Description of the Related Art

Callers place calls to entities (e.g., call centers, restaurants, government agencies, businesses, educational institutions, retailers, etc.), in order to obtain information and/or to speak to representatives within departments of an entity. In the past, callers have spent billions of minutes per day listening to silence or pre-recorded sets of repeating messages or music. Callers are subjected to navigating prompts, often outdated, presented to them by impersonal interactive voice response (IVR) telephony systems. This process is inefficient and frustrating to callers and is equally unsatisfactory to management of many of these entities. Entities have spent billions of dollars in promoting, communicating, and developing their product, service, or brand messaging in traditional marketing channels, but those entities have overlooked and/or missed various opportunities which remains untapped in the millions of calls flowing into their entities every day.

BRIEF DESCRIPTION OF THE DRAWINGS

The preferred embodiments will become apparent upon reading the following detailed description and upon reference to the accompanying drawings in which.

Figure 1A:
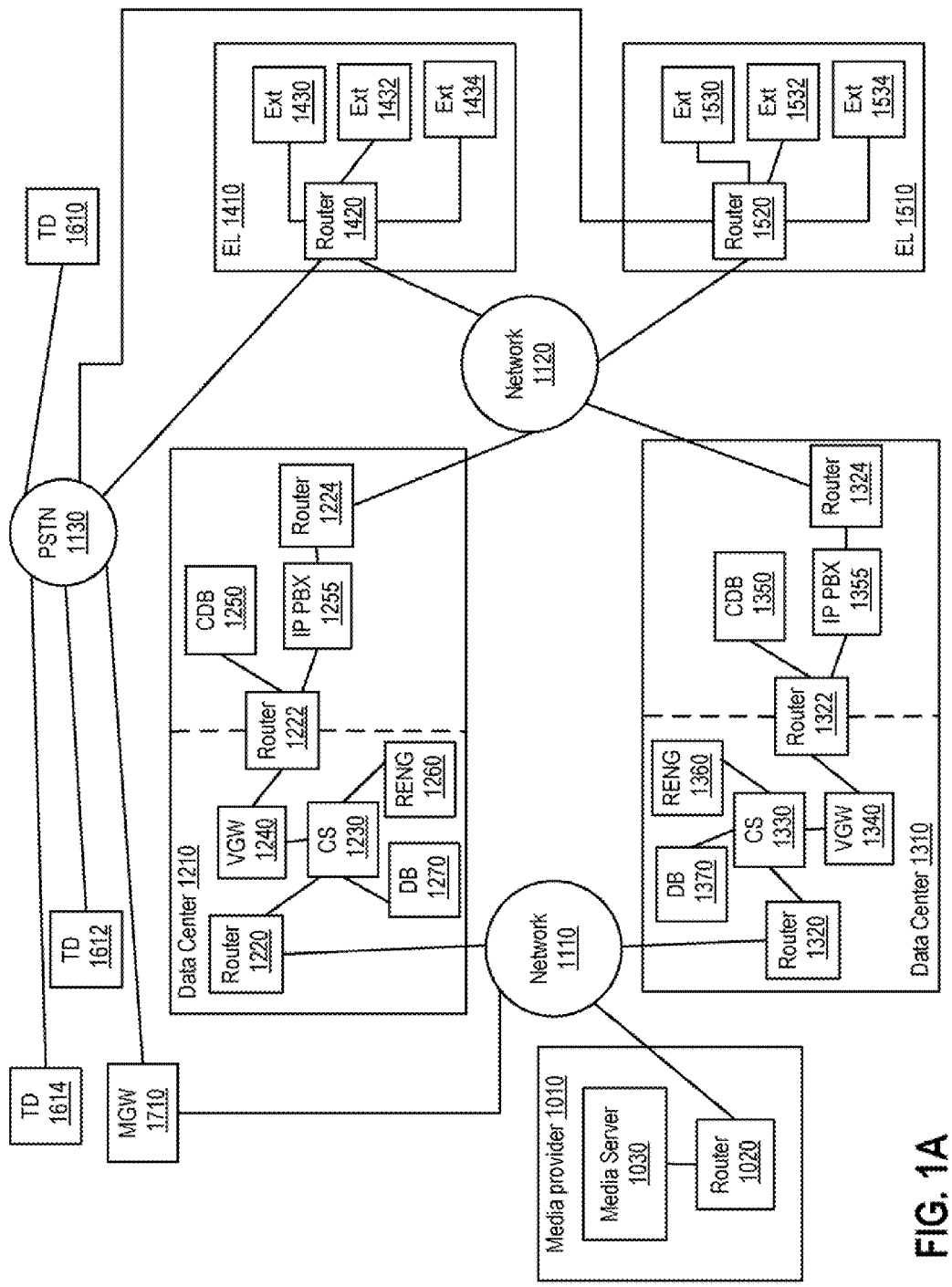
FIGS. 1A and 1B illustrate block diagrams of one or more network communication systems, according to one or more embodiments.

While the invention may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

In one or more embodiments, methods and/or systems described can transform inbound calls into a series call streams and/or call states that can include contextualized, personalized, relevant messages, information, promotions, coupons, offers, advertising, surveys, vouchers, opt-in programs and/or other specific messages. For example, targeting multi-site, national retail entities, embodiments described herein enable richly personalized experiences for on-hold customers and provide entity-wide brand consistency. For instance, a system described herein can provide callers with prompts during a call, to receive messages, offers, promotions, discounts, coupons and opt-in programs in a form of response messages (e.g., text messages, multimedia messages, etc.) to a caller's phone or email address. Upon receipt of a prompt during various segments of the call, the caller can respond, which can include a pressing of an indicated number or sequence of numbers, by voice acknowledgement, or other possible forms of confirmation which can include facial or gestural recognition in the case of video calls. In response to caller confirmation, a message or series of relevant messages that can include messages, offers, promotions, discounts, coupons and opt-in programs, can be transmitted to the caller's telephony device for use in future transactions that can be conducted with the entity.

Turning now to FIG. 1A, a block diagram of one or more network communications systems is illustrated, according to one or more embodiments. As shown in FIG. 1A, one or more telephony devices (TDs) 1610-1614 can be coupled to a public switched telephone network (PSTN) 1130. In one example, one or more of TDs 1610-1614 can be coupled to PSTN 1130 in a wired fashion. In another example, one or more of TDs 1610-1614 can be coupled to PSTN 1130 in a wireless fashion. For instance, telephony device (TD) 1610 can include a mobile telephony device (e.g., a cellular telephony device, a satellite telephony device, etc.), and the mobile telephony device can be coupled to PSTN 1130 via a cellular or satellite telephony network coupled to or included in PSTN 1130. In one or more embodiments, a TD can include a voice over Internet protocol (VoIP) telephony device. In various embodiments, a TD can include a personal digital assistant (PDA), a smart phone, or a hand-held computing device that allows a user of the TD to communicate with PSTN 1130 and/or other networks such as a wireless local area network (WLAN), among others.

Users (e.g., callers) can use TDs 1610-1614 to place calls to one or more entity locations (ELs) 1410 and 1510. As shown, PSTN 1130 can be coupled to one or more routers 1420 and 1520 of ELs 1410 and 1510, respectively. In one example, each of routers 1420 and 1520 can be coupled to PSTN 1130 via a primary rate interface (PRI). In one or more embodiments, routers 1420 and 1520 can receive the calls from one or more of TDs 1610-1614 and can determine where and/or how to route the calls. For example, routers 1420 and 1520 can determine where and/or how to route the calls based on one or more criteria and/or configurations. As illustrated, ELs 1410 and 1510 can include one or more extensions (Exts) 1430-1434 and 1530-1534, respectively. In one example, extension (Ext) 1430 of entity location (EL) 1410 can be associated with a women's clothing department of EL 1410, Ext 1432 can be associated with a women's shoe department of EL 1410, and Ext 1434 can be associated with a children's clothing department of EL 1410. In another example, Ext 1530 of EL 1510 can be associated with a lumber department of EL 1510, Ext 1532 can be associated with a paint department of EL 1510, and Ext 1534 can be associated with a power tools department of EL 1510.

As shown, data centers 1210 and 1310 can be coupled to one or more networks 1110 and 1120. In one or more embodiments, network 1110 and/or network 1120 can include a wired network, a wireless network or a combination of wired and wireless networks. In one or more embodiments, network 1110 can include a wide are network (WAN). In one example, network 1110 can include or be coupled to a WAN that accessible by the public (e.g., the Internet). In a second example, network 1110 can form part of the Internet. In another example, network 1110 can be or include a private network.

In one or more embodiments, network 1120 can include a WAN. For example, network 1120 can be or include a private network. In one or more embodiments, network 1120 can be or include a multiprotocol label switching (MPLS) network. In one example, the MPLS network can be used to create virtual links between two nodes and can encapsulate packets of various network protocols. For instance, packets of the MPLS network can be assigned labels, and the data included in the labels can be used to forward and/or route the packets of the MPLS network. In one or more embodiments, a converged MPLS router can interface and/or communicate with the MPLS network and/or provide network routing for voice and data to each of ELs 1410 and 1510. For example, one or more of routers 1224 and 1324 can be or include a converged MPLS router.

In one or more embodiments, router 1420 can be coupled to data centers 1210 and 1310 via respective routers 1224 and 1324 and network 1120, and/or router 1520 can be coupled to data centers 1210 and 1310 via respective routers 1224 and 1324 and network 1120. As shown, router 1224 can be coupled to an Internet protocol (IP) private branch exchange (PBX) 1255 that can be coupled to a router 1222, and a customer database (CDB) 1250 (e.g., a customer relationship management information database) can be coupled to router 1222. In one or more embodiments, an IP PBX can provide one or more of session initiation protocol (SIP) registration of one or more extensions (e.g., one or more of Exts 1430-1434 and 1530-1534), partitioning of extensions at locations, and routing calls based on one or more rules, among others.

In one or more embodiments, router 1224 can include a voice gateway (VGW) (e.g., an entity VGW). In one or more embodiments, router 1222 can include one or more of a firewall mechanism, a firewall service, and one or more firewall data structures. In one example, router 1222 can be used to separate and/or isolate one or more communications paths of one or more of router 1224, CDB 1250, and IP PBX 1255 from one or more of router 1220, VGW 1240, CS 1230, database (DB) 1270, and rules engine (RENG) 1260. In another example, router 1222 can be used to separate and/or isolate one or more communications paths of one or more of router 1220, VGW 1240, CS 1230, DB 1270, and RENG 1260 from one or more of router 1224, CDB 1250, and IP PBX 1255.

As shown, router 1220, DB 1270, RENG 1260 and VGW 1240 can be coupled to CS 1230, and VGW 1240 can be coupled to router 1222. In one or more embodiments, CS 1230 can include one or more of router 1220, DB 1270, RENG 1260 VGW 1240, and router 1222. In one or more embodiments, DB 1270 can include a relational database management system. For example, DB 1270 can include an Oracle database, a DB/2 database, a PostgreSQL database, a SQL Server database, a SQLite database, or a MySQL database, among others.

As illustrated, a media provider 1010 can be coupled to network 1110 via a router 1020. As shown, media provider 1010 can include a media server 1030 that can include various media and/or messages that can be included and/or provided in a telephone call. For example, media server 1030 can provide the various media and/or messages to a call server (e.g., CS 1230, CS 1330, etc.), so that the call server can provide the various media and/or messages to callers. In one or more embodiments, router 1020 can securely communicate with router 1220 and/or router 1320. In one example, routers 1020 and 1220 can communicate using at least one of Internet Protocol Security (IPSec), a secure socket layer (SSL), and transport layer security (TLS), among others. In a second example, routers 1020 and 1220 can communicate via an encrypted tunnel. In another example, routers 1020 and 1220 can communicate via a virtual private network (VPN). In one or more embodiments, routers 1020 and 1220 can include one or more of a firewall mechanism, a firewall service, and one or more firewall data structures.

As shown, a message gateway (MGW) 1710 can be coupled to network 1110. In one or more embodiments, MGW 1710 can provide one or messages via one or more of a short message service (SMS) and a multimedia messaging service (MMS) to one or more of TDs 1610-1614. For example, MGW 1710 can be accessible by a call server (e.g., CS 1230, CS 1330, etc.) via an application programming interface (API). For instance, the call server can use MGW 1710 and its API to fulfill sending one or more of contextualized messages, personalized messages, text messages, multimedia messages, information, promotions, coupons, offers, surveys, vouchers, and opt-in programs, among others, to one or more of TDs 1610-1614

In one or more embodiments, data center 1310 can be a secondary or backup data center to data center 1210. For example, elements 1320-1370 of data center 1310 can include one or more same and/or similar structures and/or functionalities as those described with reference to respective elements 1220-1270 of data center 1210. In one or more embodiments, DB 1370 can be synchronized with DB 1270. For example, DB 1370 can include data of DB 1270 should data center 1210 become unreachable or should DB 1270 or another element of data center 1210 fail.

Figure 1B:
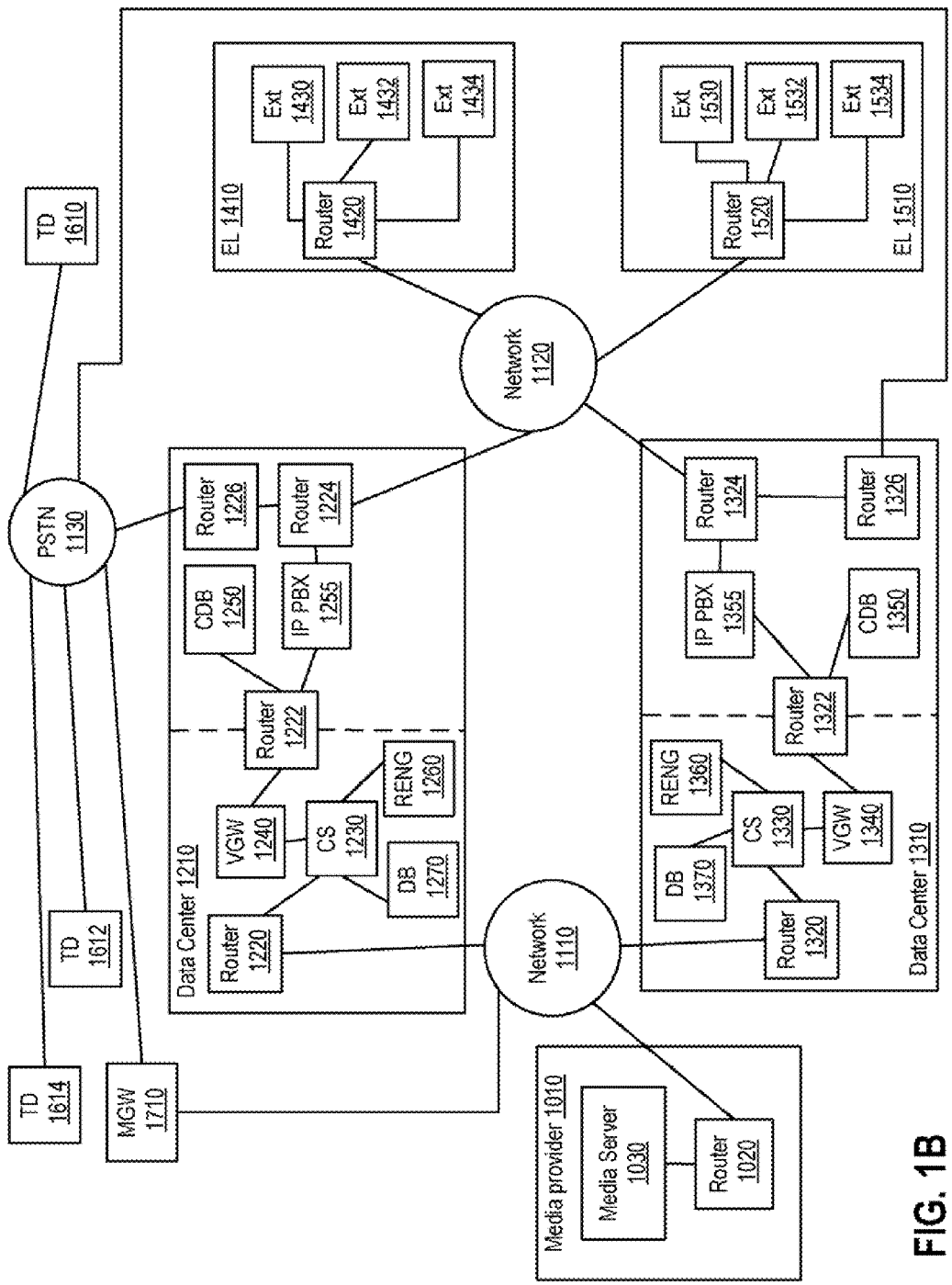

Turning now to FIG. 1B, a block diagram of one or more network communications systems is illustrated, according to one or more embodiments. As shown, FIG. 1B can include elements of FIG. 1A. As illustrated, PSTN 1130 can be coupled to a router 1226 included in data center 1210 and coupled to router 1224, and PSTN 1130 can be coupled to a router 1326 included in data center 1310 and coupled to router 1324. In one or more embodiments, ELs 1410 and 1510 can be coupled to PSTN 1130 via network 1120 and routers 1224 and 1226 or routers 1324 and 1326. As illustrated, ELs 1410 and 1510 can be coupled to network 1120 via respective routers 1420 and 1520.

Figure 2:
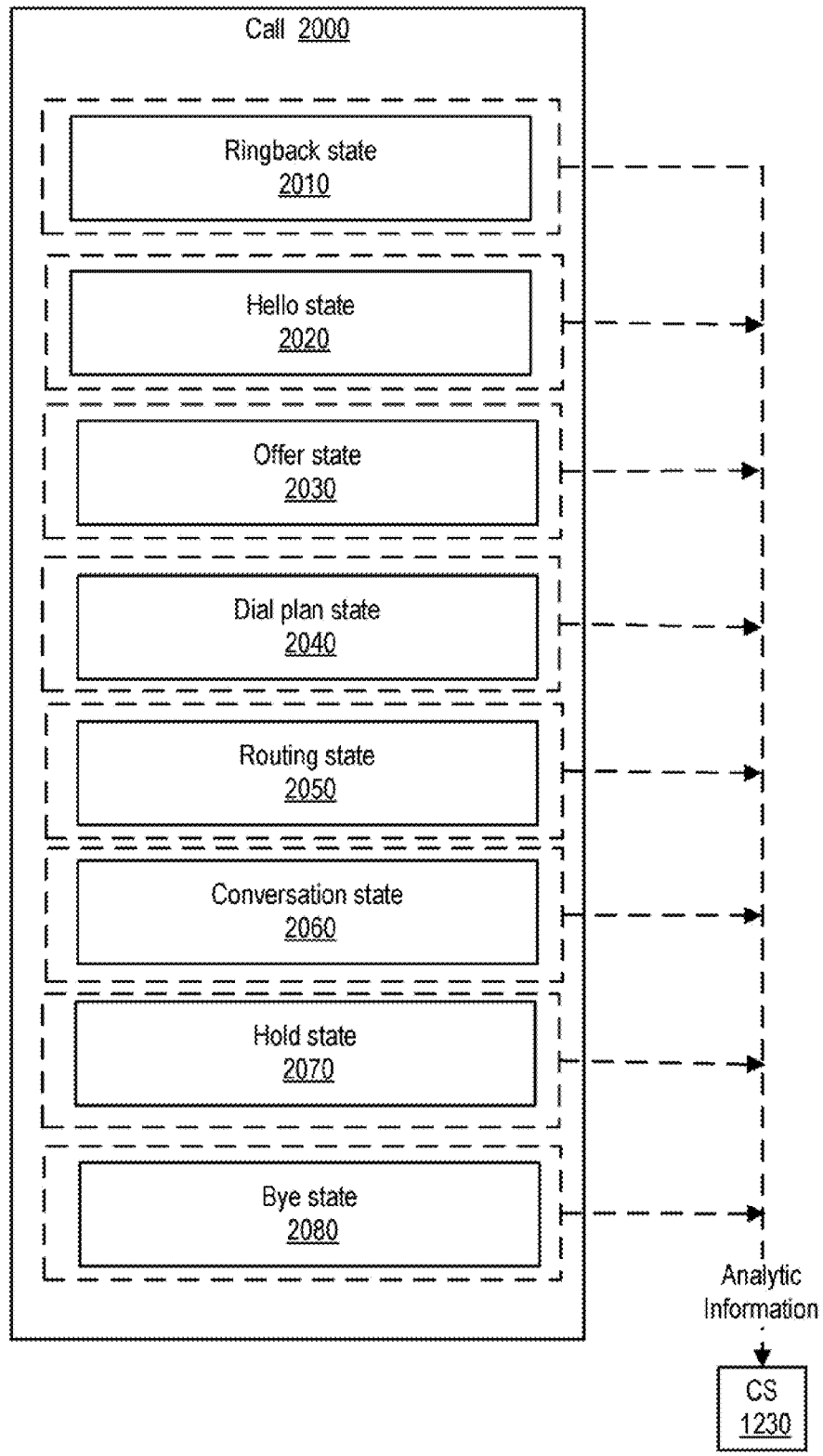
FIG. 2 illustrates a block diagram of states of a telephone call within a telephony management system, according to one or more embodiments.

Turning now to FIG. 2, a block diagram of states of a telephone call within a telephony management system is illustrated, according to one or more embodiments. As shown, a call 2000 can include one or more states 2010-2080. In one or more embodiments, one state can follow another state without a specific order, and/or one or more states can be repeated. In one example, routing state 2050 or hold state 2070 can follow conversation state 2060. In another example, routing state 2050 and/or dial plan state can be repeated. In one or more embodiments, states 2010-2080, as shown, may not depict any specific order and are enumerated for exemplary and/or identification purposes.

As illustrated, analytic information associated with one or more of states 2010-2080 can be sent to and/or collected by CS 1230, according to one or more embodiments. In one example, the analytic information can include information associated with whether or not a rule of a rules engine was invoked and/or whether or not the rule of the rules engine was matched. In a second example, the analytic information can include information associated with what media was presented to a caller and/or what time the media was presented to the caller. In a third example, the analytic information can include information associated with a received call (e.g., call time, called number, calling number, etc.). In a fourth example, the analytic information can include information associated with a call transfer (e.g., call transfer time, transfer number, calling number, etc.). In a fifth example, the analytic information can include information associated with a disconnection of a call (e.g., disconnection call time, called number, calling number, etc.). For instance, the call may have been disconnected by the caller hanging up during a call state or disconnecting after a "bye" state. In a sixth example, the analytic information can include information associated with whether or not a message was proffered to a caller and/or whether or not the message was accepted by the caller. In a seventh example, the analytic information can include information associated with providing a customized menu to a caller and/or whether or not a specific customized menu matched one or more portions of a profile of the caller.

In one or more embodiments, ringback state 2010 can include sending media to a TD that has placed a call to an entity. For example, the media sent to the TD can include audio and/or video information that can convey information associated with the entity and/or one or more goods and/or services that can be provided by the entity. For instance, call information associated with call 2000 can include one or more of an identification of the TD (caller ID) and a telephone number that the TD called (DNIS or called party) that can be used to determine and/or provide the media sent to the TD.

In one or more embodiments, a first state of a call entered by the TD upon answer of the call at the telephony management system is the "hello" state. The hello state 2020 can include providing an acknowledgement portion to the TD. For example, the acknowledgement can be based on the call information and/or profile information associated with the call information. In one instance, the acknowledgement can thank the user of the TD for being a rewards member of the entity. In another instance, the acknowledgement can thank the user of the TD for calling the entity.

In one or more embodiments, offer state 2030 can include sending offer information to the TD. In one or more embodiments, one or more methods and/or systems described enable presentation of offer information to users of various offer types for callers to accept or decline during a course of a set of call states presented during the call. The offer types presented in the offer information include offers to receive information, discounts, coupons, reviews, directions or other types of information. Further, the offer information can be presented in various forms. For example, the offer information can include one or more of audio, a graphic or image, text, and a video that is associated with one or more of the entity, the entity location, a brand of an item and/or service for sale by the entity, a sale event, a store-wide sale event, a department sale event, hours and/or days of operation of the entity and/or an entity location. The offer information further includes instructions for the caller to accept or decline the offer for delivery of the message. In one embodiment, the offer information indicates delivery of the message to the caller's mobile telephone. In one example, the message can be sent via a SMS or a MMS.

The caller can indicate whether or not the offered message is to be sent to the TD. For example, the user can send DTMF signaling information that can indicate whether or not the message is to be sent to the TD. In another instance, the information from the user can include voice information that can indicate whether or not the message is to be sent to the TD. In one or more embodiments, the message sent to the TD can include one or more of audio information, video information, graphic information, and text information. For example, the message can include one or more of contextualized message(s), personalized message(s), information, coupon(s), promotion(s), advertisement(s) survey(s), voucher(s), directions, map(s), membership program(s), event information, brand information, product information, music, tones (e.g., sonic logos, sound marks, etc.), opt-in program(s) and other specific offer(s). In one or more embodiments, the message can be an advertisement promoting a brand for a good or service separately offered for discount, promotion, or sale. In another instance, the offer can include a discount and/or coupon for one or more goods and/or services for sale by the entity. In one or more embodiments, one or more of the offer, the discount, the coupon, and/or the advertisement can be associated with a third party in addition to or instead of the entity. Still further, in one or more embodiments, the message can be based on one or more portions of the profile information associated with the call information.

In one or more embodiments, dial plan state 2040 can include sending a menu (e.g., an audio menu, a graphical menu, etc.) to the TD. In one example, a default menu can be sent to the TD. In another example, a menu can be built or configured using the call information and/or one or more portions of the profile information associated with the call information, and can be sent to the TD. In one or more embodiments, the default menu and/or the configured menu can include choices or options to use one or more other menus (e.g., submenus), choices or options to be transferred to a department and/or extension, and/or to receive a message. For example, the message can include one or more of contextualized message(s), personalized message(s), information, coupon(s), promotion(s), survey(s), voucher(s), directions, map(s), membership program(s), event information, brand information, product information, music, tones (e.g., sonic logos, sound marks, etc.), opt-in program(s) and other specific offers(s).

In one or more embodiments, routing state 2050 can include transferring the call to a person, department, and/or extension of the entity coupled to the telephony management system. In one example, transferring the call to a department and/or extension can include sending media (e.g., audio media, graphical media, video media, etc.) to the TD while the call is being transferred. In another example, transferring the call to a department and/or extension can include sending a message to the TD while the call is being transferred. In one or more embodiments, conversation state 2060 can include a conversation of the user of the TD and an employee or representative of the entity.

In one or more embodiments, hold state 2070 can include sending media (e.g., audio media, graphical media, video media, etc.) to the TD while the call is on hold. In one example, the audio and/or video media can be a media stream from a multicast of media streams. For instance, a determination of the media stream from the multicast of media streams can be based on the call information, a geographic location of the TD, and/or one or more portions of the profile information associated with the call information. In one or more embodiments, the profile information can include demographic information of the user of the TD. In one or more embodiments, a last state of the call, state 2080 (a "bye" state), can include sending media (e.g., audio media, graphical media, video media, etc.) to the TD near a conclusion of the call. For example, the media can thank the user of the TD for calling the entity and/or for patronage.

Figure 3:
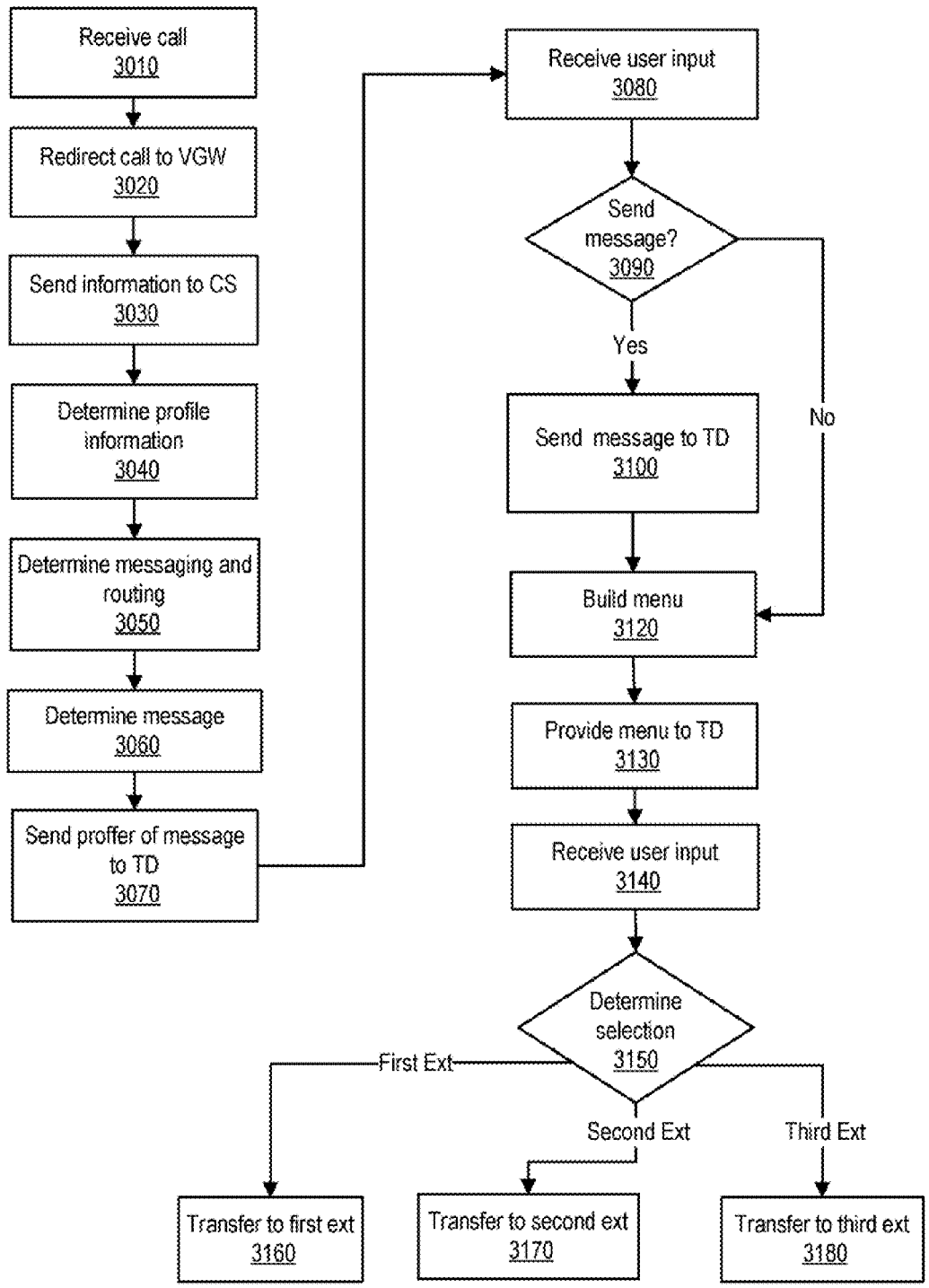
FIG. 3 illustrates a method of sending a message to a telephony device.

Turning now to FIG. 3, a method of sending a message to a telephony device is illustrated, according to one or more embodiments. At 3010, a call can be received. For example, router 1420 can receive a call from TD 1610 via PSTN 1130. At 3020, the call can be redirected to a voice gateway. For example, router 1420 can redirect the call to VGW 1220. At 3030, call information associated with the call can be sent to a call server. For example, VGW 1220 can send the call information associated with the call to CS 1230. In one or more embodiments, the call information associated with the call can include one or more of an identification of the TD (caller ID) and a telephone number that the TD called (DNIS or called party). In one or more embodiments, VGW 1220 can communicate with CS 1230 via a socket connection over a network. In one example, VGW 1220 can communicate with CS 1230 using a hypertext transfer protocol (HTTP) via the socket. In another example, VGW 1220 can communicate with CS 1230 using a data description language, such as VoiceXML (VXML), via the socket. In one or more embodiments, VXML can provide call control. For example, VGW 1220 can receive one or more of dual-tone multi-frequency (DTMF) signaling information and voice information and provide the information corresponding to the DTMF signaling information and/or the voice information to CS 1230.

At 3040, profile information associated with the call information can be determined. In one or more embodiments, determining the profile information can include querying a database for the profile information associated with the call information. For example, CS 1230 can perform a structured query language (SQL) query of DB 1270 using the call information to determine the profile information. For instance, the profile information associated with multiple users can be indexed by one or more of an identification of a TD and a telephone number that the TD called. In one or more embodiments, DB 1270 can be periodically updated with caller information from CDB 1250.

In one or more embodiments, the profile information associated with the call information can include information associated with the user of the TD. For example, the profile information can include information associated with the user such as one or more of a time zone, a country, a state, a city, a zip code, a telephony device type, a telephony device operating system, a telephony device phone number, a distance from an entity location, at least one movie rented, at least one television show watched, a number of children, at least one investment, at least one product purchase, a marital status, an age, at least one interest, at least one hobby, a gender, a birthday, an income, at least one past transaction, a content rating, a membership status, and at least one past department of an entity called, among others. At 3050, messaging and routing for the call can be determined based on one or more of the determined profile information and the telephone number that the TD called. In one or more embodiments, CS 1230 can utilize rules engine 1260 to determine messaging and routing for the call. For example, one or more portions of the profile information can match and/or satisfy one or more rules of rules engine 1260 to determine messaging and routing for the call.

At 3060, a message can be determined. In one example, the message can be associated with one or more of the entity, the entity location, a brand of an item and/or service for sale by the entity, a sale event, a store-wide sale event, a department sale event, hours and/or days of operation of the entity and/or an entity location. In a second example, the message can include an advertisement. In another example, the message can include a discount and/or coupon for one or more goods and/or services for sale by the entity. In one or more embodiments, the message can be based on one or more portions of the profile information associated with the call information. In one or more embodiments, one or more of a message, a coupon, an offer, an advertisement, and a discount can be associated with a third party in addition to or instead of the entity.

At 3070, a proffer of a message can be sent to the TD. In one or more embodiments, the proffer of the message can convey a request of the user to provide input to accept or decline the message. In one example, the proffer of the message can convey a request of the user to input a number on a keypad of the TD to indicate that the message is to be sent to the TD. For instance, the request of the user to input a number on a keypad of the TD can convey: "Press 'one' to receive the message, or press 'two' to continue." In another example, the proffer of the message can convey a request of the user to speak a word into a sound input device of the TD to indicate that the message is to be sent to the TD. For instance, the request of the user to speak a word can convey: "Say 'yes' to receive the message, or say 'no' to continue."

At 3080, the user input can be received. For example, CS 1230 can receive, via VGW 1240, information from the user indicating whether or not the message is to be sent to the TD. In one instance, the information from the user can include DTMF signaling information that can indicate whether or not the user is to be sent to the TD. In another instance, the information from the user can include voice information that can indicate whether or not the message is to be sent to the TD. At 3090, it can be determined whether or not to send the message to the TD. If the message is not to be sent to the TD, the method can proceed to 3120. In one or more embodiments, an amount of time transpiring without receiving user input can indicate that the message is not to be sent to the TD.

If the message is to be sent to the TD, the message can be sent to the TD at 3100. In one or more embodiments, the message can be sent to the TD can include one or more of audio information, video information, graphic information, and text information. In one example, the message can be sent via a SMS or a MMS. For instance, CS 1230 can send a SMS message or a MMS message that includes the message via MGW 1710 to TD 1610. In another example, the message can be sent via a data network. In one instance, the message can be sent via a data network such as public-accessible wide area network such as the Internet. In another instance, the message can be sent via a data network such as a cellular telephone network that supports data communications other than telephone conversations. In one example, the message can be sent via an email message to an email address of the user of the TD. In another example, the message can be sent to an application that is configured to execute on the TD.

In one or more embodiments, the message can include one or more of textual information, image information, video information, and audio information. In one example, a text message can include the message. In another example, one or more graphics and/or images can include the message. For instance, the one or more graphics and/or images can include a bar code (e.g., a computer-readable one or two-dimensional bar code) that can be used as a coupon or discount for one or more goods and/or services. In one or more embodiments, the message can be used to identify one or more of the TD and the user of the TD. For example, the bar code that can be used as a coupon or discount for one or more goods and/or services can include information that can be used to identify one or more of the TD and the user of the TD.

At 3120, a menu for the call can be built. For example, CS 1230 can retrieve multiple pieces of media from storage and/or DB 1270 and combine the multiple pieces of media to build the menu for the call. In one instance, the multiple pieces of media can be ordered based on one or more portions of the profile information. For example, a piece of media associated with a department where the user spends more time and/or more money can be prioritized to be included in the menu before other pieces of media. For instance, a piece of media may include "Press 'one' for the ladies' shoes department" and may be prioritized to be included in the menu before another piece of media such as "Press 'two' for the men's department", based on information of the caller's profile. In this fashion, the menu options (e.g., digits "one", "two", "three", etc.) can be dynamically mapped and/or planned contextually.

In one or more embodiments, building the media for the various call states can include cross fading multiple pieces of media. For instance, the multiple pieces of media can include multiple audio files, and building various media sequences and/or the menu can include combining the multiple audio files such that the various media sequences and/or the menu appears to be a continuous audio stream to a human ear.

At 3130, the menu can be provided to the TD. At 3140, user input can be received. For example, CS 1230 can receive information from the user indicating a department and/or extension. In one instance, the information from the user can include DTMF signaling information that can indicate the department and/or extension. In another instance, the information from the user can include voice information that can indicate the department and/or extension.

At 3150, a selection, based on the user input, can be determined. For example, the menu can include two or more departments and/or extensions, and the selection of a department and/or extension can be determined from the user input. If the selection is for a first department and/or extension, then the call can be transferred to the first department and/or extension at 3160. If the selection is for a second department and/or extension, then the call can be transferred to the second department and/or extension at 3170. If the selection is for a third department and/or extension, then the call can be transferred to the third department and/or extension at 3180.

Figure 4:
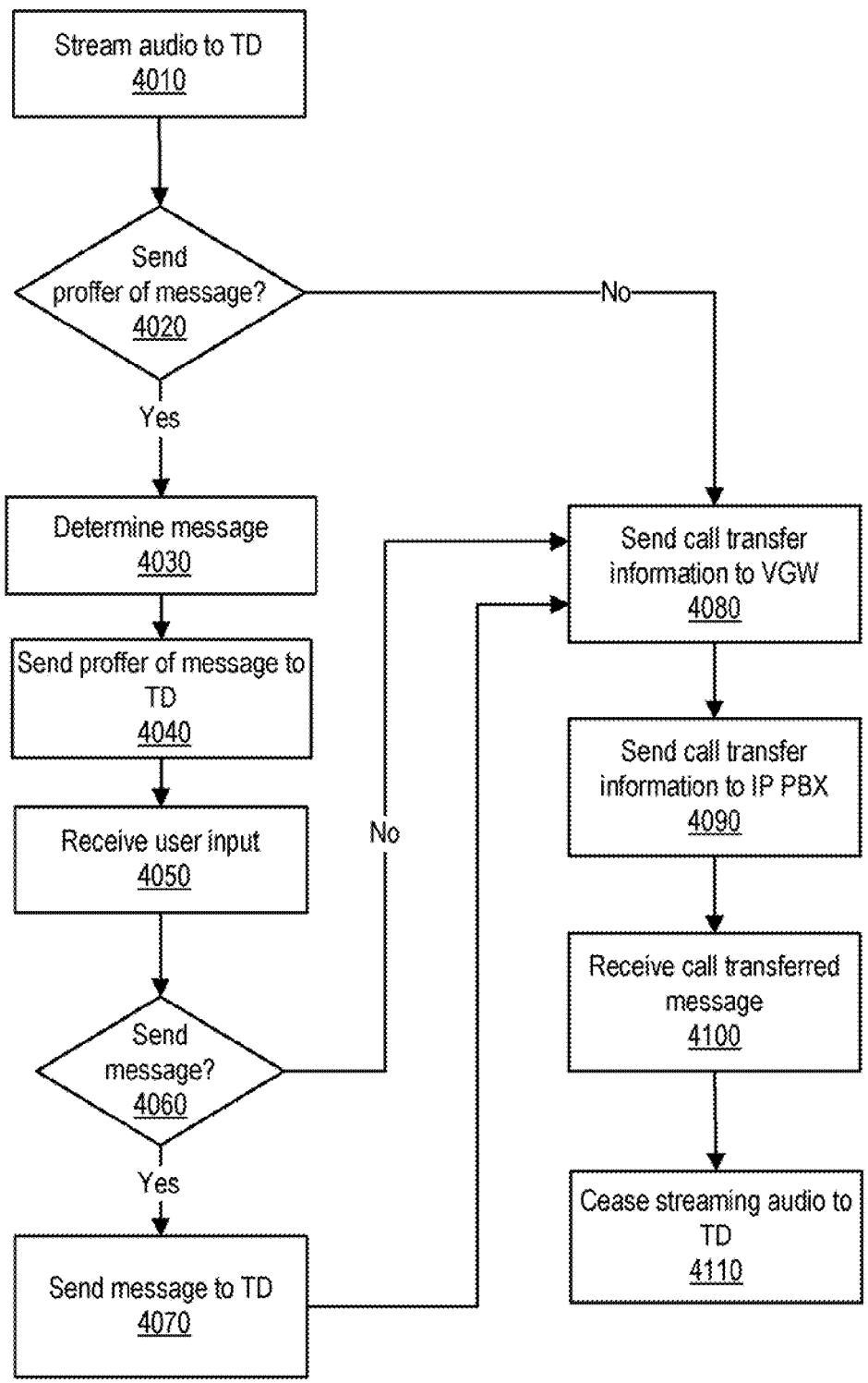
FIG. 4 illustrates a method of transferring a call from a telephony device to an extension within the telephony management system.

Turning now to FIG. 4, a method of transferring a call from a telephony device to an extension within the telephony management system is illustrated, according to one or more embodiments. At 4010, audio signals and/or data can be streamed and/or transmitted to the TD. For example, CS 1230 can stream and/or transmit audio that is specific to the user of the TD or that is sourced from one or more audio streams. In one instance, the stream of audio can be based on one or more portions of the profile information associated with the call information. For example, the stream of audio can include information that is specific to and/or customized for the caller based on one or more portions of the profile information associated with the call information. In another instance, the stream of audio can be one of a multicast of audio streams. In one or more embodiments, CS 1230 can be a source of the multicast of audio streams.

In one or more embodiments, an audio stream of the multicast of audio streams can be determined based on one or more portions of the profile information associated with the call information. For example, a portion of the profile information can include an age. In one instance, a first audio stream of the multicast of audio streams can be determined if the age is within thirteen to sixteen years of age. In another instance, a second audio stream of the multicast of audio streams can be determined if the age is within forty-three to fifty-five years of age. In one or more embodiments, an audio stream of the multicast of audio streams can be determined based the extension that the call is being transferred. For example, a first audio stream of the multicast of audio streams can be determined if the call is being transferred to Ext 1430, and a second audio stream of the multicast of audio streams can be determined if the call is being transferred to Ext 1432.

In one or more embodiments, a message can be included in the audio stream. At 4020, it can be determined whether or not to send a proffer of a message. If it is determined not to send the proffer of a message, then the method can proceed to 4080. If it is determined to send the proffer of a message, a message can be determined at 4030. In one or more embodiments, the message can be determined in a same or similar fashion as determined at 3060 of FIG. 3. At 4040, the proffer of the message can be sent to the TD. In one or more embodiments, the proffer of the message can be sent to the TD in a same or similar fashion as 3070 of FIG. 3.

At 4050, user input can be received. In one or more embodiments, the user input can be received in a same or similar fashion as user input can be received with reference to method element 3080 of FIG. 3. At 4060, it can be determined whether or not to send the message to the TD. In one or more embodiments, determining whether or not to send the message to the TD can be performed in a same or similar fashion as 3090 of FIG. 3. If the message is not to be sent to the TD, the method can proceed to 4080. If the message is to be sent to the TD, the message can be sent to the TD at 4070. In one or more embodiments, the message can be sent to the TD in a same or similar fashion as the message can be sent to the TD with reference to method element 3100 of FIG. 3.

At 4080, call transfer information can be sent to a VGW. For example, CS 1230 can send the call transfer information to VGW 1240. For instance, the call transfer information can include extension information and an address. In one or more embodiments, the address can include an Internet protocol (IP) address. For example, the address can be an IP address of a router that manages communications for an entity location. For instance, the IP address can be an IP address of router 1420 that manages communications for EL 1410, and the call transfer information can be of form similar to "1430@IPaddress", where IPaddress is an IP address of router 1420 and "1430" can be used by router 1420 to route the call transfer to Ext 1430. In one or more embodiments, the IP address of the router that manages communications for the entity location can be a publicly routable IP address. In one or more embodiments, the IP address of the router that manages communications for the entity location can be a private IP address. For example, the private IP address may be associated with one or more IP addresses described in Request for Comments (RFC) 1918 which is available from the Internet Engineering Task Force (IETF). For instance, network 1120 can be a private network that uses private IP addresses. At 4090, the call transfer information can be sent to an IP PBX to transfer the call. For example, VGW 1240 can send the call transfer information to IP PBX 1255 via a SIP.

In one or more embodiments, CS 1230 can be or include a SIP agent that can continue to stream the audio to the TD and maintain a SIP state while other one or more portions of methods and/or processes are occurring. At 4100, a call transferred message can be received. For example, CS 1230 can receive a SIP message indicating that the call has been transferred to Ext 1430. At 4110, the audio that is streamed to the TD can be ceased or stopped.

Figure 5:
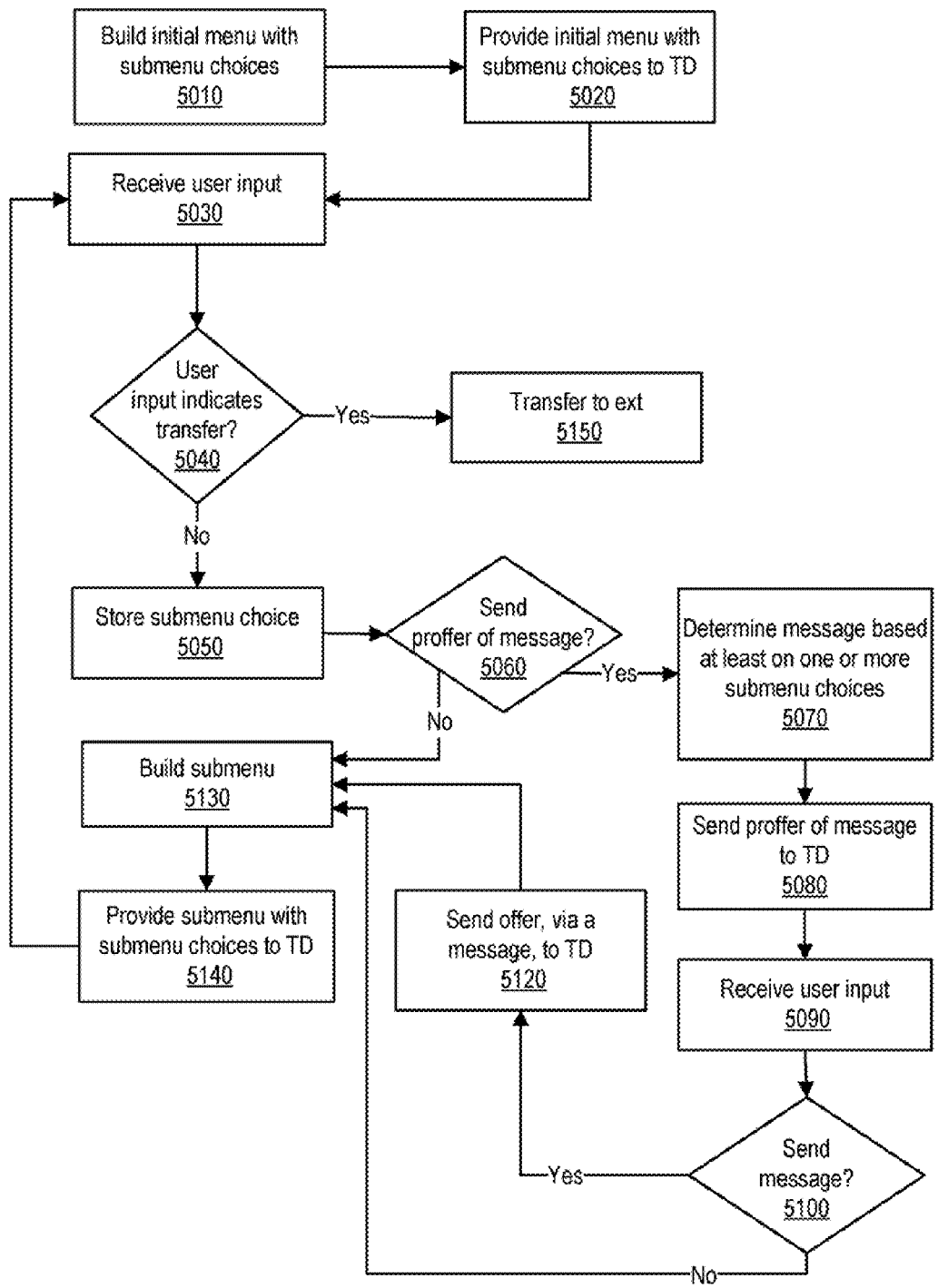
FIG. 5 illustrates a method of providing a message based at least on one or more submenu choices.

Turning now to FIG. 5, a method of providing a message based at least on one or more submenu choices is illustrated, according to one or more embodiments. At 5010, an initial menu can be built with one or more submenu choices and can include one or more department and/or extension choices. In one or more embodiments, the initial menu can be built in a similar fashion to the menu built in method element 3120 of FIG. 3. In one or more embodiments, the submenu choices of the initial menu can include choices that are user selectable to navigate to another menu associated with a choice. In one example, a submenu choice can be for a hardware department that can lead to a submenu that can include two or more submenu items or options of plumbing hardware, fasteners (e.g., screws, bolts, nuts, nails, glue, etc.), and electrical hardware (e.g., wire, electrical outlets, circuit breakers, etc.), among others. In another example, a submenu choice can be for a children's department that can lead to a submenu that can include two or more submenu items or options of children's shoes, boys' clothing, girls' clothing, toddlers' clothing, and pre-teens' clothing, among others.

At 5020, the initial menu with submenu choices can be provided to the TD. For example, CS 1230 can provide the initial menu with submenu choices to TD 1610. At 5030, user input can be received. For example, CS 1230 can receive user input from TD 1610, and the user input can include a choice from the initial menu. In one instance, the user input can include DTMF signaling information that can indicate a choice from the initial menu. In another instance, the user input can include voice information that can indicate a choice from the initial menu.

At 5040, it can be determined whether or not the user input indicates a transfer. For example, a menu choice from the initial menu can be associated with a department and/or extension. For instance, the menu choice can be associated with Ext 1430. If the user input indicates a menu choice that is associated with a department and/or extension, the call can be transferred to the department and/or extension at 5150. If the user input does not indicate a menu choice that is associated with a department and/or extension, the method can proceed to 5050, where the submenu choice can be stored.

At 5060, it can be determined whether or not to send a proffer of a message. In one or more embodiments, CS 1230 can determine whether or not to send the proffer of a message to the user of the TD based on a number of submenu choices that have been selected by the user, an ordered sequence of two or more submenu choices that have been selected by the user, an ability of the TD to receive a message, a distance the TD is from an entity location, an amount of time transpiring during the call, and/or one or more portions of the profile information associated with the call information.

In one or more embodiments, determining whether or not to send the proffer of a message to the user of the TD can include determining whether or not the TD includes a capability to receive a message. In one example, CS 1230 can search a database using the call information associated with the call to determine whether or not the TD includes the capability to receive the message. In one instance, the database can include telephone numbers (e.g., caller IDs) and corresponding one or more capabilities associated with the telephone numbers, and CS 1230 can search the database using the telephone number (e.g., caller ID) of TD 1610 to determine whether or not TD 1610 can receive the message. In another instance, the database can include telephone numbers (e.g., caller IDs) and corresponding one or more communication methods and/or systems that can be used to send the message to the user of the TD. For example, CS 1230 can search the database using the telephone number (e.g., caller ID) of TD 1610 to determine whether or not an email address is associated with the telephone number of TD 1610, where the email address can be used to send the message to the user of TD 1610.

In one or more embodiments, determining whether or not to send the proffer of a message to the user of the TD can include determining a distance the TD is from an entity location. In one example, CS 1230 can search a database using the call information associated with the call to determine distance the TD is from an entity location. For instance, the database can include telephone numbers (e.g., caller IDs) and corresponding geographic locations associated with the telephone numbers, and CS 1230 can search the database using the telephone number (e.g., caller ID) of TD 1610 to determine the geographic location of TD 1610. Using the geographic location (e.g., latitude, longitude, and/or altitude) of TD 1610 and a geographic location of an entity location, CS 1230 can determine a distance TD 1610 is from the entity location.

In a second example, CS 1230 can query a system (e.g., a cellular telephone system, a satellite telephony system, a VoIP telephony system, etc.) using the call information associated with the call to determine a distance the TD is from an entity location. In one instance, the system can provide a geographic location of the TD or a geographic location of a cellular telecommunications antenna communicating with the TD. In another instance, CS 1230 can provide a geographic location of an entity location and the telephone number (e.g., caller ID) of TD 1610 to the system, and the system can respond by providing a distance TD 1610 is from the entity location.

In another example, CS 1230 can query TD 1610 for a geographic location of TD 1610, and TD 1610 can respond by providing its geographic location that can be usable by CS 1230 to determine a distance TD 1610 is from an entity location. In one instance, TD 1610 can include a global positioning (GPS) device that can determine a geographic location of TD 1610 that can be provided to CS 1230. In a second instance, a system (e.g., a cellular telephone system) can provide a geographic location of TD 1610 or a geographic location of a cellular telecommunications antenna communicating with TD 1610 to TD 1610. In another instance, the user of TD 1610 can provide a geographic location of TD 1610 to TD 1610. In one example, the user can provide one or more of a zip code, an address, a town or city name, and an intersection of streets, among others, to TD 1610.

If it is determined not to send the proffer of a message, then the method can proceed to 5130. If it is determined to send the proffer of a message, a message can be determined at 5070, where a message can be determined based at least on one or more submenu choices. In one example, the message can be determined based on a number of submenu choices that have been selected by the user. In a second example the message can be determined based on an ordered sequence of two or more submenu choices that have been selected by the user. In one or more embodiments, the message can also be determined based on one or more portions of the profile information associated with the call information and/or a distance from an entity location. In one example, a first message can include a first discount (e.g., a first coupon) for one or more goods and/or services to a first TD (e.g., TD 1610) based on a first distance the first TD is from the entity location (e.g., EL 1410), and a second message can include a second discount (e.g., a second coupon) for the one or more goods and/or services to a second TD (e.g., TD 1612) based on a second distance the second TD is from the entity location. For instance, the second distance can be greater than the first distance, and the second discount can be greater than the first discount. In a second example, the message can include one or more of a map and directions to an entity location.

At 5080, the proffer of the message to the TD can be sent to the TD. In one or more embodiments, the proffer of the message can be sent to the TD in a same or similar fashion as 3070 of FIG. 3. At 5090, user input can be received. In one or more embodiments, the user input can be received in a same or similar fashion as user input can be received with reference to method element 3080 of FIG. 3. At 5100, it can be determined whether or not to send the message to the TD. In one or more embodiments, determining whether or not to send the message to the TD can be performed in a same or similar fashion as 3090 of FIG. 3. If the message to the TD is not to be sent to the TD, the method can proceed to 5130. If the message to the TD is to be sent to the TD, the message can be sent to the TD at 5120. In one or more embodiments, the message can be sent to the TD in a same or similar fashion as the message can be sent to the TD with reference to method element 3100 of FIG. 3.

At 5130, a submenu can be built. In one or more embodiments, the submenu can be built in a similar fashion to the menu built in method element 5010. At 5140, the submenu can be provided to the TD. In one or more embodiments, the submenu can be provided to the TD in a similar fashion to providing the initial menu to the TD in method element 5020. In one or more embodiments, the method can proceed to 5030. In one or more embodiments, a submenu of an initial menu or another submenu may include two or more department and/or extension options without further submenu options. In one or more embodiments, a submenu of an initial menu or another submenu may include one or more submenu options and/or one or more department and/or extension options that have already been presented to the user of the TD during the call.

Figure 6:
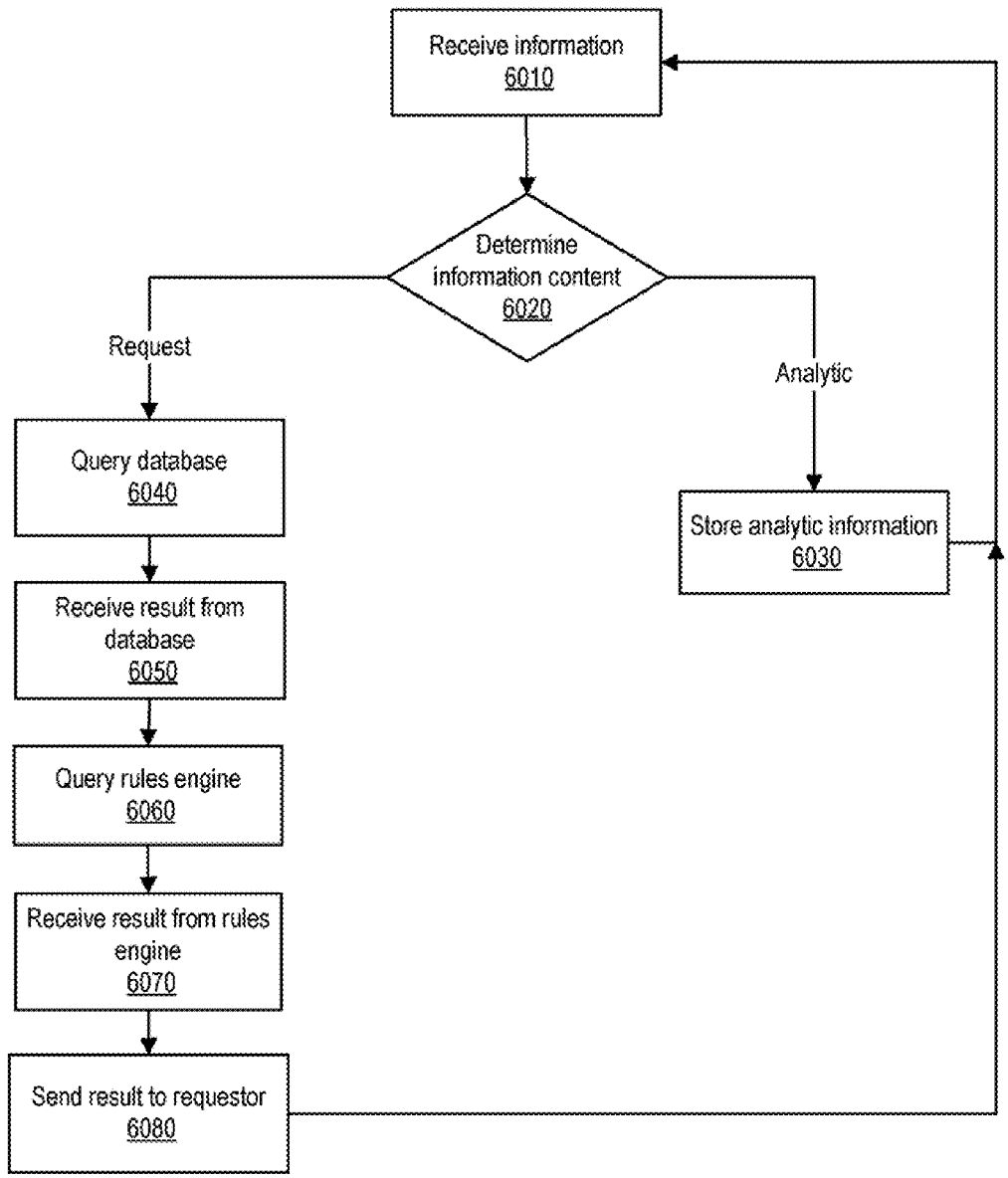
FIG. 6 illustrates a method of operating a telephony management system.

Turning now to FIG. 6, a method of operating a telephony management system is illustrated, according to one or more embodiments. At 6010, the call server (e.g., CS 1230, CS 1330, etc.) can receive information. For example, the received information can include analytic information that can be stored or can be request information. In one instance, the analytic information can include information of and/or resulting from one or more of states 2010-2080. For example, the analytic information can include a result from a condition evaluation. In another instance, the request information can include a request for information from a rules engine (e.g., RENG 1260, RENG 1360, etc.). In one or more embodiments, the received information can be from a device different from the call server or from a method or process utilized by the call server.

At 6020, content of the received information can be determined. If the received information includes analytic information, then the analytic information can be stored at 6030. In one example, the analytic information can be stored in a log file (e.g., a log file of the call server). In another example, the analytic information can be stored in a database (e.g., DB 1270, DB 1370, etc.). In one or more embodiments, the method can proceed to 6010.

If the received information includes request information, then the method can proceed to 6040 where a database (e.g., DB 1270, DB 1370, etc.) can be queried. In one or more embodiments, querying the database can include sending information to the database. For example, one or more of an identification of a TD (caller ID) and a telephone number that the TD called (DNIS or called party) can be sent to the database, where the database can use the one or more of the identification of the TD and the telephone number that the TD called to retrieve associated information. At 6050, a result can be received from the database.

At 6060, a rules engine (e.g., RENG 1260, RENG 1360, etc.) can be queried. In one or more embodiments, querying the rules engine can include sending information to the rules engine. In one example, the rules engine can be sent information to determine whether or not to proffer a message to a user of a TD. In a second example, the rules engine can be sent information to determine a message to be sent to a user of a TD. In a third example, the rules engine can be sent information associated with a call sequence or call state. In another example, the rules engine can be sent information associated with the result from the database query.

At 6070, a result from the rules engine can be received. In one or more embodiments, the result from the rules engine can include a default result (e.g., no rule matched the query information) or a result based on the query information matching one or more rules. At 6080, the result from the rules engine can be sent to the device, method, or process that sent the request for the result. In one or more embodiments, the method can proceed to 6010.

Figure 7:
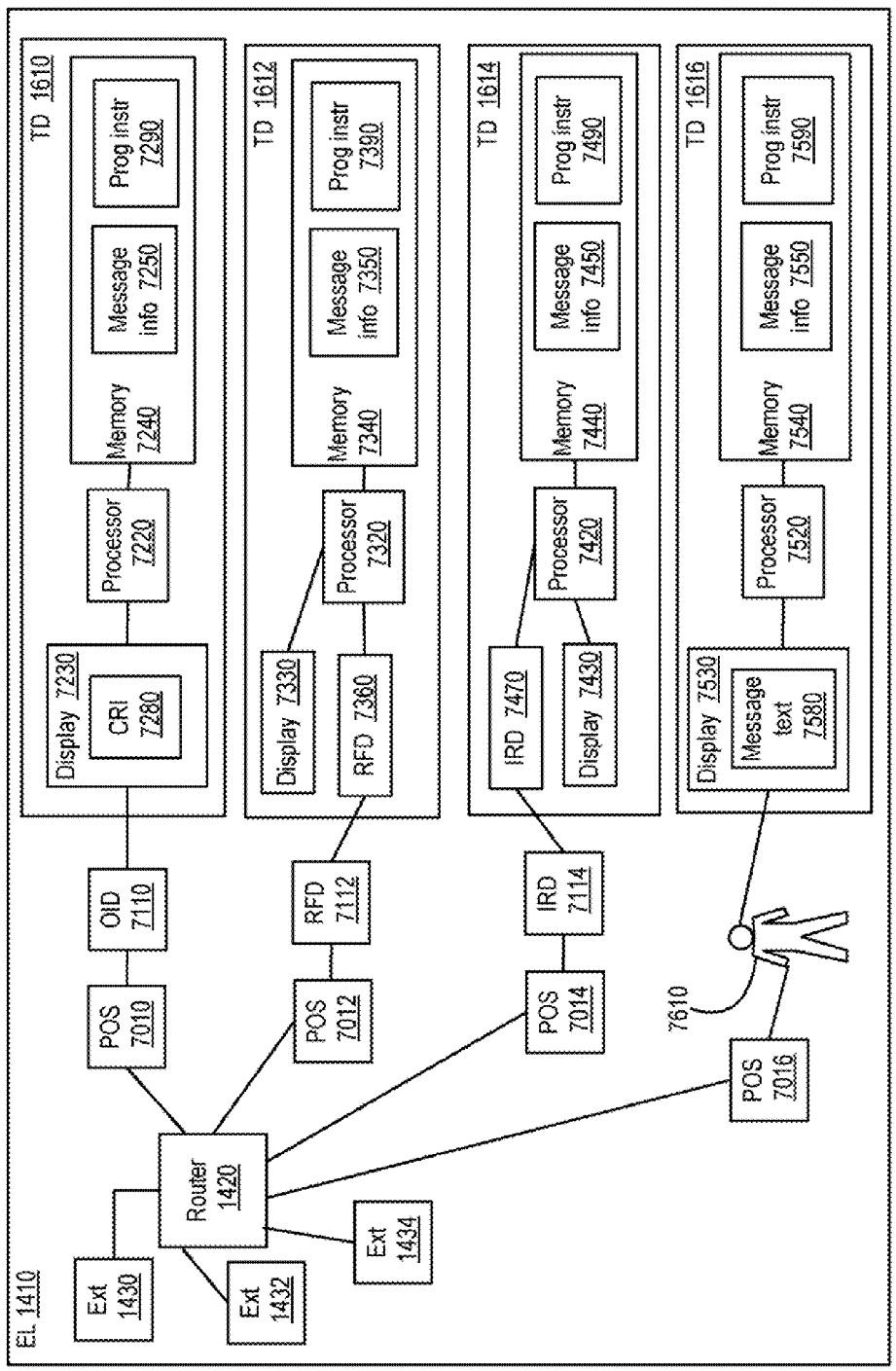
FIG. 7 illustrates an exemplary block diagram of an entity location that receives messages from users' telephony devices, according to one or more embodiments.

Turning now to FIG. 7, an exemplary block diagram of an entity location that receives messages from users' telephony devices is illustrated, according to one or more embodiments. In one or more embodiments, EL 1410 can include one or more point of sale terminals (POSes) 7010-7016 coupled to router 1420, and each of POSes 7010-7016 can be or include a computing device. In one or more embodiments, a point of sale terminal (POS) (e.g., a POS of POSes 7010-1016) can receive message information, or information associated with the message information, sent from a TD (e.g., a TD of TDs 1610-1616). For example, the message information, or information associated with the message information, can include a coupon that can be used to provide a discount on compensation (e.g., cost) for one or more goods and/or services messageed for sale by an entity. For instance, POS 7010 can receive a coupon via message information 7250, or information associated with the message information 7250, and a user of TD 1610 can receive ten percent (10%) off a purchase of ladies shoes, a brand of ladies shoes, clothing, a brand of clothing, one or more goods and/or services messaged for sale by the entity, etc. In one or more embodiments, message information, or information associated with the message information, sent from a TD to a POS can include an identifier and/or an index that is usable to identify one or more of a message, a coupon, the TD, and a user of the TD, among others.

In one or more embodiments, EL 1410 can include an optical input device (OID) 7110 coupled to POS 7010, where OID 7110 can sense and/or discern one or more images from a display 7230 of TD 1610 and/or from a paper medium. For example, OID 7110 can transform the one or more images from display 7230 of TD 1610 and/or from the paper medium and provide data associated with the one or more images to POS 7010, where the data is usable by POS 7010 and conveys message information to POS 7010. In one or more embodiments, OID 7110 and/or POS 7010 can use one or more of pattern recognition, artificial intelligence, and computer vision systems and/or methods to determine information conveyed by the one or more images from display 7230 of TD 1610 and/or from the paper medium. In one or more embodiments, determining the information conveyed by the one or more images can include transforming optical signals from the one or more images into data that can be used by a computing device and/or stored in a memory medium included in or coupled to the computing device.

In one example, OID 7110 can sense and/or discern a computer-readable image (CRI) 7280 displayed by display 7230 of TD 1610 and provide information that is included and/or encoded in CRI 7280 to POS 7010. For instance, CRI 7280 can include a barcode, and OID 7110 can sense and/or discern the barcode displayed by display 7230 and provide information that is included and/or encoded in the barcode to POS 7010. In one or more embodiments, the information included and/or encoded in CRI 7280 can include information associated with message information 7250. In one or more embodiments, message information 7250 can be received by TD 1610 when CS 1230 sends a message to TD 1610.

In one or more embodiments, EL 1410 can include a radio frequency device (RFD) 7112 coupled to POS 7012. For example, RFD 7112 can include one or more of a radio frequency receiver and a radio frequency transmitter configured to communicate with a TD, such as TD 1612. As shown, TD 1612 can include a RFD 7360 that can include one or more of a radio frequency receiver and a radio frequency transmitter configured to communicate with another RFD, such as RFD 7112. In one or more embodiments, RFD 7360 can transmit message information 7350 to RFD 7112, and RFD 7112 can provide message information 7350 to POS 7012. In one example, a user of TD 1612 can direct TD 1612 to transmit message information 7350 to RFD 7112. In another example, RFD 7112 can transmit a query to TD 1612, via RFD 7360, and TD 1612 can respond to the query by transmitting message information 7350 to RFD 7112, via RFD 7360. In one or more embodiments, message information 7350 can be received by TD 1612 when CS 1230 sends a message to TD 1612.

In one or more embodiments, RFDs 7112 and 7360 can communicate using one or more ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others. In one or more embodiments, RFDs 7112 and 7360 can communicate using one or more of IEEE 802.11, IEEE 802.15, IEEE 802.15.4, ZigBee, 6LoWPAN, spread spectrum of frequencies, frequency modulation of a carrier wave, and amplitude modulation of a carrier wave, among others. In one or more embodiments, TD 1612 can be identified by information used in communicating with RFD 7112 and/or POS 7012. In one example, TD 1612 can be identified by a media access control (MAC) address used in communicating with RFD 7112 and/or POS 7012. In another example, TD 1612 can be identified by an IP address or a portion of an IP address used in communicating with RFD 7112 and/or POS 7012. For instance, IPv6 (Internet protocol version 6) can be used in communicating with RFD 7112 and/or POS 7012, and TD 1612 can be identified by IP address or a portion of an IP address used by TD 1612 can be used to identify TD 1612. In one or more embodiments, one or more of the MAC address, the IP address, and the portion of the IP address can be included in analytic information that can be sent CS 1230 for storage and/or analysis.

In one or more embodiments, EL 1410 can include an infrared device (IRD) 7114 coupled to POS 7014. For example, IRD 7114 can include one or more of an infrared receiver and an infrared transmitter configured to communicate with another IRD, such as an IRD 7470. As shown, TD 1614 can include IRD 7470 which can include one or more of an infrared receiver and an infrared transmitter configured to communicate with another IRD, such as IRD 7114. In one or more embodiments, IRD 7470 can transmit message information 7450 to IRD 7114, and IRD 7114 can provide message information 7450 to POS 7014. In one example, a user of TD 1614 can direct TD 1614 to transmit message information 7450 to IRD 7114. In another example, IRD 7114 can transmit a query to TD 1614, via IRD 7470, and TD 1614 can respond to the query by transmitting message information 7450 to IRD 7114, via IRD 7470. In one or more embodiments, message information 7450 can be received by TD 1614 when CS 1230 sends a message to TD 1612.

In one or more embodiments, an entity can use an entity associate 7610 (e.g., an employee of the entity, a contractor of the entity, a volunteer of the entity, etc.) to read message text 7580 from a display 7530 of a TD 1616, and entity associate 7610 can provide message text 7580 to POS 7016. For example, entity associate 7610 can provide message text 7580 to POS 7016 via a keyboard or keypad of or coupled to POS 7016. In one or more embodiments, message text 7580 can include information associated with message information 7550. For example, information associated with message information 7550 can be included and/or encoded in message text 7580. In one or more embodiments, message information 7550 can be received by TD 1616 when CS 1230 sends a message to TD 1616.

As shown, each of TDs 1610-1616 can include respective processors 7220-7520 coupled to respective memories 7240-7540 and coupled to respective displays 7230-7250. In one or more embodiments, memories 7240-7540 can include respective message information 7250-7550 and respective program instructions 7290-7590 that can be executed on a respective processor to implement one or more methods and/or systems described herein. As illustrated, TD 1612 can include RFD 7360 coupled to processor 7320, and TD 1614 can include IRD 7470 coupled to processor 7420.

Figure 8A:
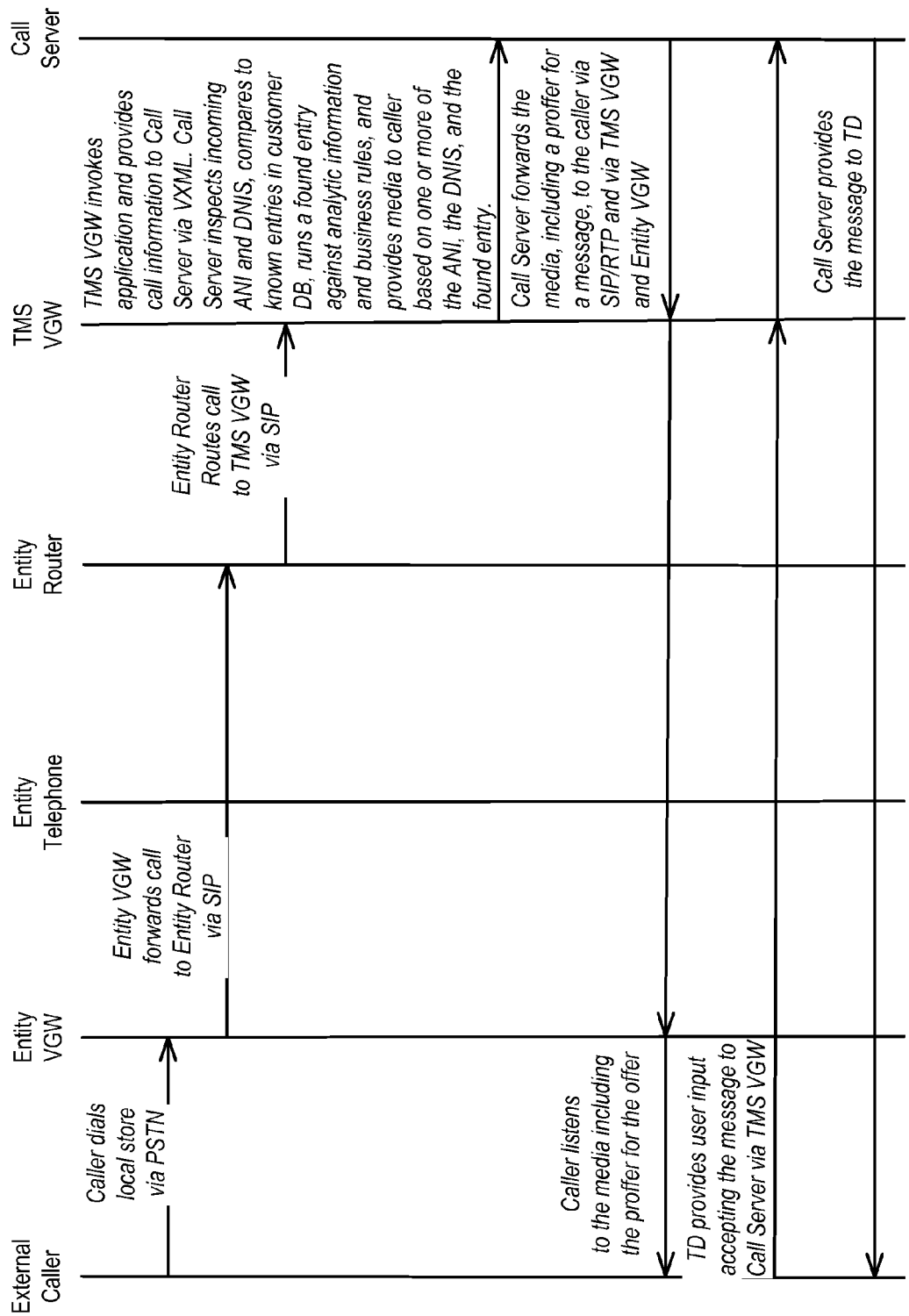
FIGS. 8A and 8B illustrate sequence diagrams of an exemplary call flow, according to one or more embodiments.
Figure 8B:
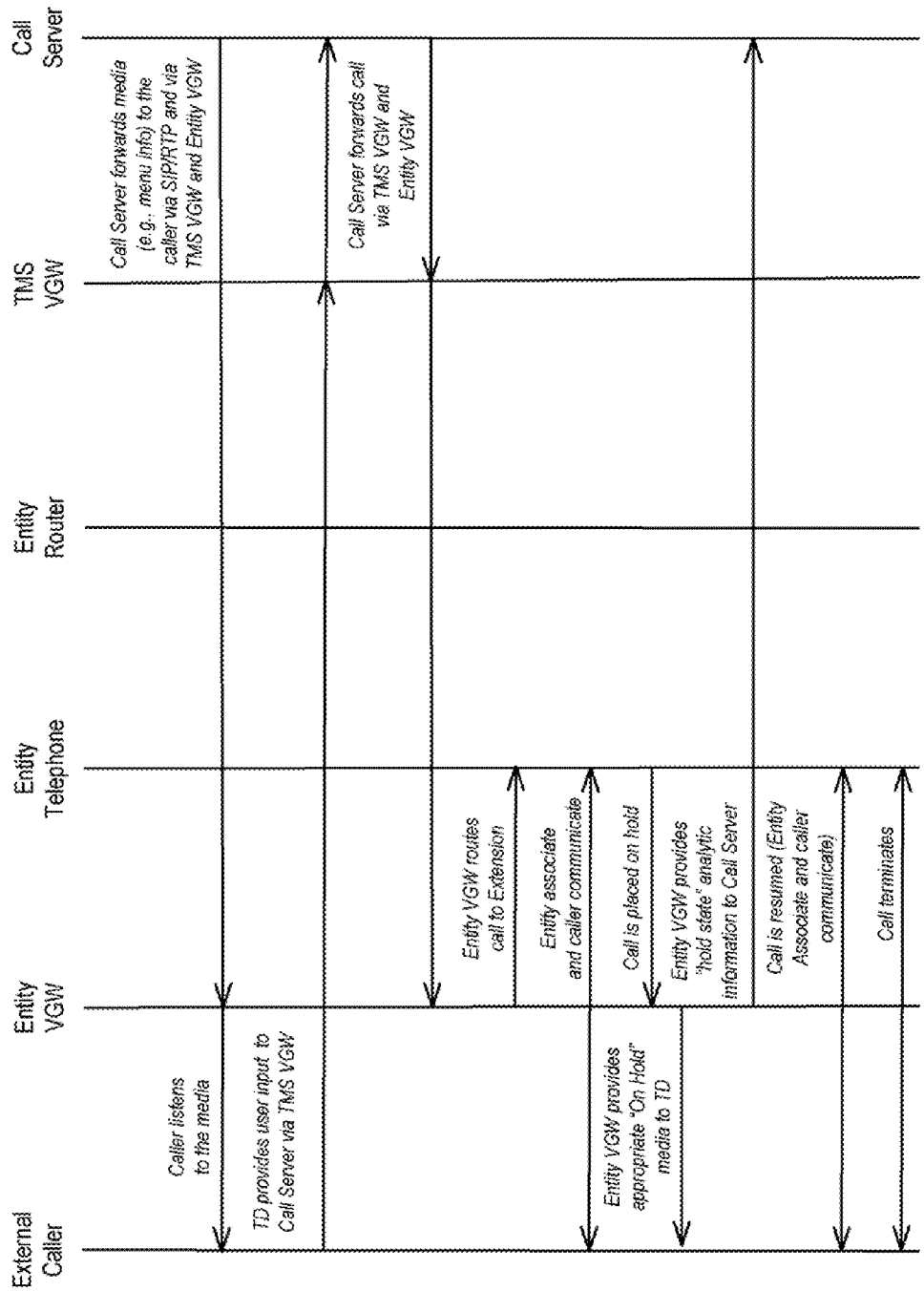

Turning now to FIGS. 8A and 8B, sequence diagrams of an exemplary call flow is illustrated, according to one or more embodiments. As shown, a caller can dial into an entity VGW (e.g., router 1420), and the entity VGW can forward the call to an entity IP PBX (e.g., IP PBX 1255). The entity IP PBX can route the call to a TMS (telephony management system) VGW that can invoke an application on a call server (e.g., CS 1230) which implements one or more methods described herein. In one or more embodiments, the TMS VGW can provide call information to the call server via VXML (Voice eXtensible Markup Language). For example, the call information can include an identification of the TD (ANI or caller ID) and a telephone number that the TD called (DNIS or called party).

The application executing on the call server can query a customer database (e.g., CDB 1250) or a database (e.g., DB 1270) that includes caller information from the customer database to determine at least one entry that includes caller profile information associated with the identification of the TD. Using the caller profile information and one or more of analytic information and business rules, the application executing on the call server can determine and/or produce media that includes a proffer of a message to provide to the caller. In one or more embodiments, the media can include the multiple messages that are cross-faded together. For example, cross-fading the multiple pieces of media can include combining the multiple audio files such that the media appears to be a continuous audio stream to a human ear. For instance, the media can include information such as "Thank you for calling Corkies Department Store at Barton River Mall. Please press 'one' to receive a coupon to receive ten percent off any pair of ladies shoes, or press 'two' to continue."

The caller can provide user input to the TD that indicates a request for or an acceptance of the proffer for the message. For example, the user can press "one" on a keypad of the TD, and the TMS VGW can receive DTMF signaling information indicating the "one" on the keypad of the TD. The TMS VGW can provide VXML data to the call server that indicates the "one" on the keypad of the TD, and the call server can provide the message to the TD. In one example, the call server can send a coupon for ten percent off any pair of ladies shoes to the TD via MGW 1710. In another example, the call server can send a coupon for ten percent off any pair of ladies shoes to an email address associated with the caller via a data network. In one or more embodiments, the coupon can include text and/or graphics usable to receive ten percent off any pair of ladies shoes and/or to identify one or more of the TD and the user of the TD.

Using the caller profile information and one or more of analytic information and business rules, the application executing on the call server can determine and/or produce media (e.g., a menu) to the caller. In one or more embodiments, the media can include the multiple pieces of media that are cross-faded together. For instance, the media can include information such as "Please make a selection from the following menu items. Press 'one' for our ladies department; press 'two' for our teens' department; press 'three' for our children's department; press 'four' for our men's department; or press 'zero' for operator assistance." The caller can provide user input to the TD that indicates the ladies department. For example, the user can press "one" on a keypad of the TD, and the TMS VGW can receive DTMF signaling information indicating the "one" on the keypad of the TD. The TMS VGW can provide VXML data to the call server that indicates the "one" on the keypad of the TD, and the call server can forward (e.g., transfer) the call to an entity telephone (e.g., Ext 1432) via the TMS VGW and the entity VGW.

Figure 9:
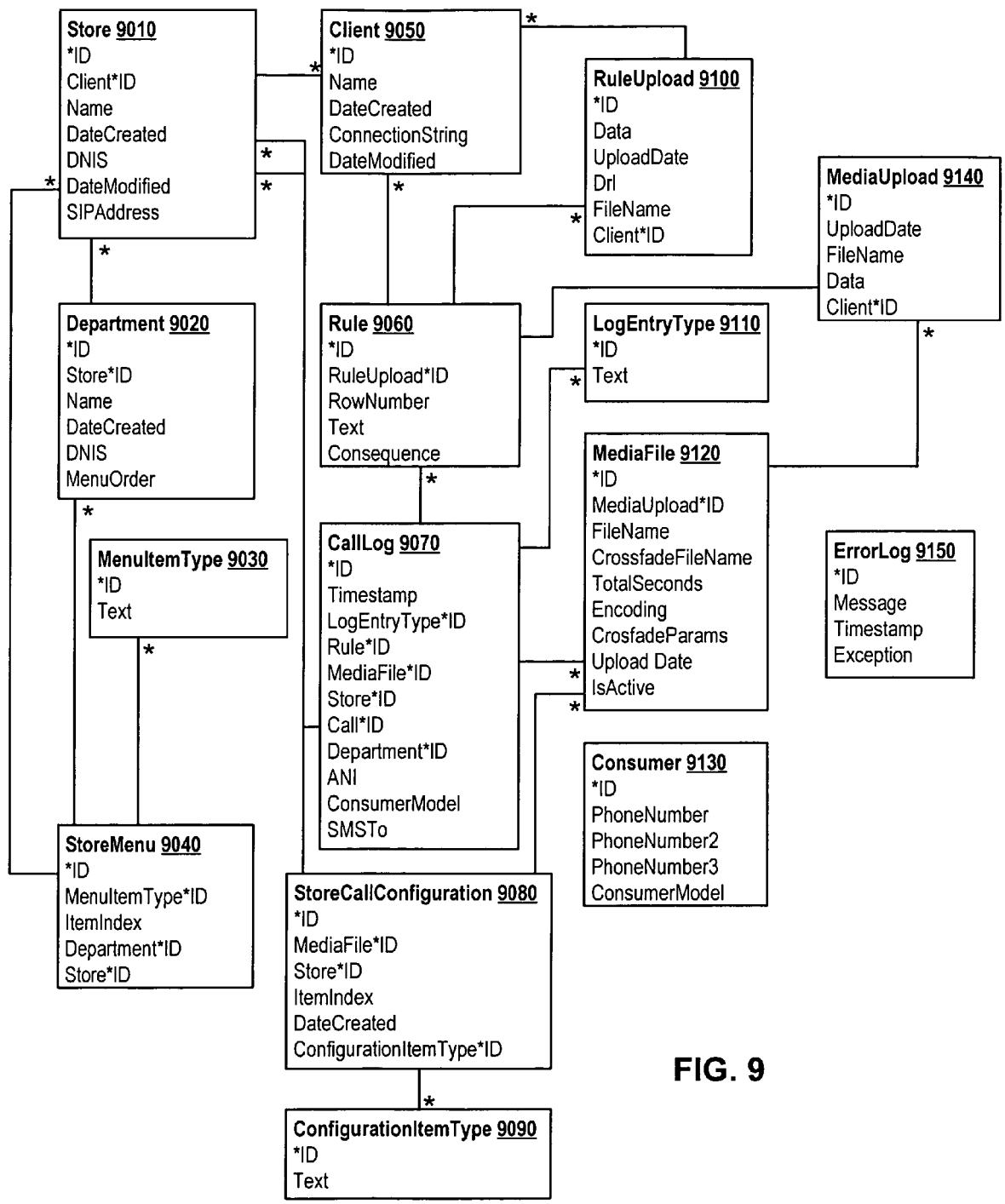
FIG. 9 illustrates an exemplary entity-relational diagram that can be used in a rules engine, according to one or more embodiments.

Turning now to FIG. 9, an exemplary entity-relational diagram that can be used in a rules engine is illustrated, according to one or more embodiments. As shown, the entity-relational diagram (ERD) can include tables 9010-9150. In one or more embodiments, the rules engine can be implemented using a database (e.g., DB 1270, DB 1370, etc.), and tables 9010-9150 can store information associated with implementing the rules engine. For example, the database can be or include a relational database system (RDBMS), where one or more tables of the ERD can be linked to one or more other tables of the ERD via one or more primary keys and/or foreign keys. For instance, Department table 9020 can be linked to Store table 9010 via a foreign key (e.g., Department.StoreID). In another instance, StoreMenu table 9040 can be linked to Store table 9010 via a first foreign key (e.g., StoreMenu.StoreID) and can be linked to Department table 9020 via a second foreign key (e.g., StoreMenu.DepartmentID).

Figure 10:
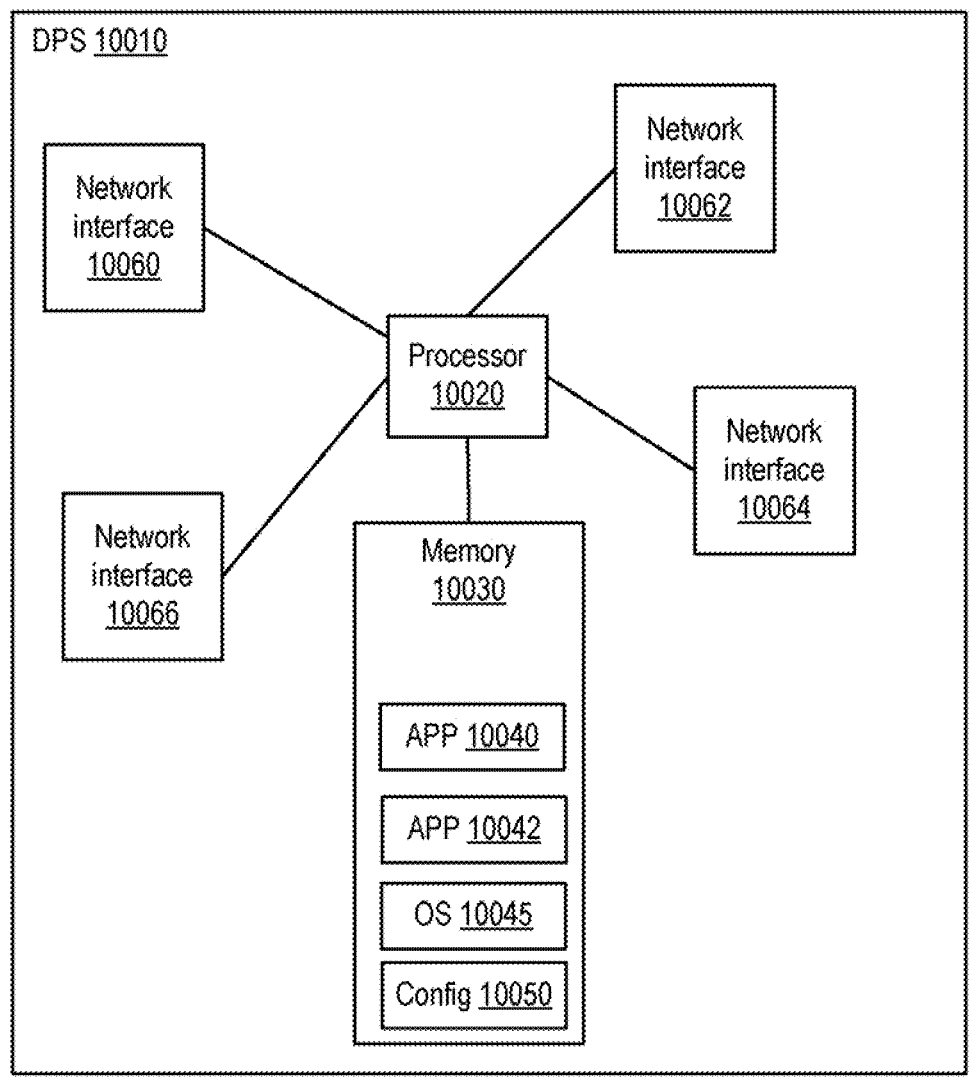
FIG. 10 illustrates an exemplary block diagram of a data processing system, according to one or more embodiments.

Turning now to FIG. 10, an exemplary block diagram of a data processing system is illustrated, according to one or more embodiments. As shown, a data processing system (DPS) 10010 can include a processor 10020, a memory 10030 coupled to processor 10020, and one or more network interfaces 10060-10066 coupled to processor 10020. As illustrated, memory 10030 can include one or more applications (APPs) 10040 and 10042, an operating system (OS) 10045, and/or a configuration 10050. In one or more embodiments, one or more of APPs 10040 and 10042 and OS 10045 can store program instructions that are executable by processor 10020 to implement on or more processes and/or methods described herein. In one or more embodiments, configuration 10050 can store configuration information usable by one or more of APPs 10040 and 10042 and OS 10045 to implement on or more processes and/or methods described herein.

In one or more embodiments, one or more of network interfaces 10060-10066 can be configured to be coupled to one or more of a router, a network, a telephony system, a telephony network, a telephony device, and another DPS, among others. In one or more embodiments, one or more of the devices and/or systems described herein can include same and/or similar structures and/or functionalities as those described with reference to DPS 10010. For example, one or more of: routers 1020, 1220-1226, 1420 1320-1326, and 1520; VGWs 1240 and 1340; CSs 1230 and 1330; media server 1030; DBs 1270 and 1370; RENGs 1260 and 1360; CDBs 1250 and 1350; IP PBXs 1255 and 1355; and POSes 7010-7016 can include same and/or similar structures and/or functionalities as those described with reference to DPS 10010.

In one or more embodiments, the term "memory" can mean a "memory medium" and/or "computer readable memory medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product. For example, an article of manufacture and/or a software product can include a memory medium that includes instructions executable by a processor to perform one or more portions of one or more methods and/or processes described herein.

In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), tablet computing device, laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
receiving information from a telephony device operated by a user that indicates a department of an entity;
determining a message for the user based on at least a current call state associated with the telephony device from among a plurality of call states, wherein determining the message for the user based on the at least the current call state associated with the telephony device from among the plurality of call states is further based on the information from the telephony device that indicates the department of the entity; and
sending the determined message to the telephony device.

2. The method of claim 1, further comprising:
querying, based on the identification information associated with the telephony device, a database for profile information of the user;
wherein determining the message for the user based on the identification information associated with the telephony device is further based on the profile information of the user.

3. The method of claim 2, wherein the profile information includes one or more of a time zone, a country, a state, a city, a zip code, a telephony device type, a telephony device operating system, a telephony device phone number, a distance from an entity location, at least one movie rented, at least one television show watched, a number of children, at least one investment, at least one product purchase, a marital status, an age, at least one interest, at least one hobby, a gender, a birthday, an income, at least one past transaction, a content rating, a membership status, and at least one past department of an entity called.

4. The method of claim 1, further comprising:
querying, based one the identification information associated with the telephony device, a database for profile information of the user;
building a menu that includes a plurality of menu options and a plurality of cross faded media, wherein the menu is based on the identification information associated with the telephony device and the profile information;
providing the menu to the telephony device; and
receiving, from the telephony device, user input information indicating a menu option from the plurality of menu options;
wherein determining the message for the user based on the at least one of the identification information associated with the telephony device and the current call state associated with the telephony device from among the plurality of call states is further based on the user input information indicating the menu option from the plurality of menu options; and
wherein the profile information includes one or more of a time zone, a country, a state, a city, a zip code, a telephony device type, a telephony device operating system, a telephony device phone number, a distance from an entity location, at least one movie rented, at least one television show watched, a number of children, at least one investment, at least one product purchase, a marital status, an age, at least one interest, at least one hobby, a gender, a birthday, an income, at least one past transaction, a content rating, a membership status, and at least one past department of an entity called.

5. The method of claim 4, wherein building the menu includes:
selecting a sequence of media files; and
combining the sequence of media files to produce the plurality of cross faded media.

6. The method of claim 1, wherein sending, via the message, the message to the telephony device includes using at least one of a short message service (SMS) and a multimedia messaging service (MMS) to send the message to the telephony device.

7. The method of claim 1, wherein sending the message to the telephony device includes sending the message via a data network.

8. The method of claim 1, wherein the message is associated with an entity associated with a telephone number dialed from the telephony device.

9. The method of claim 1, wherein the message is associated with an entity associated with the telephony network.

10. The method of claim 1, wherein the message includes one or more images.

11. The method of claim 10,
wherein at least one of the one or more images is configured to convey computer-readable information via a display of the telephony device; and
wherein computer-readable information is usable to identify one or more of the message, the telephony device, and the user.

12. The method of claim 11, wherein the computer-readable information includes a barcode that includes the information usable to identify one or more of the message, the telephony device, and the user.

13. The method of claim 1, wherein the message includes information usable to identify one or more of the telephony device and the user.

14. The method of claim 1, wherein the message includes one or more of textual information, image information, video information, and audio information.

15. The method of claim 1, wherein the telephony device is a mobile telephony device or a voice over Internet protocol (VoIP) telephony device.

16. The method of claim 1, further comprising:
determining an identification of the user based on the identification information associated with the telephony device;

wherein determining the message for the user based on the at least one of the identification information associated with the telephony device and the current call state associated with the telephony device from among the plurality of call states is further based on the identification of the user.

17. The method of claim 1, wherein the user input information indicating the request for or the acceptance of the message includes one or more of dual-tone multi-frequency (DTMF) signaling information, voice information, gestural information from the user that indicates the request for or the acceptance of the message.

18. The method of claim 1, further comprising:
determining that the telephony device is a mobile telephony device or a voice over Internet protocol (VoIP) telephony device.

19. The method of claim 18, wherein determining that the telephony device is the mobile telephony device or the VoIP telephony device is based on the identification information associated with the telephony device.

20. The method of claim 18, wherein determining that the telephony device is the mobile telephony device or the VoIP telephony device is based on information received from the telephony device.

21. The method of claim 20, wherein the information received from the telephony device includes one or more of dual-tone multi-frequency (DTMF) signaling information and voice information from the user.

22. The method of claim 1, further comprising:
determining a geographic location of the telephony device;
wherein determining the message for the user based on the at least one of the identification information associated with the telephony device and the current call state associated with the telephony device from among the plurality of call states is further based on the geographic location of the telephony device.

23. The method of claim 22, wherein determining the geographic location of the telephony device is based on the identification information associated with the telephony device.

24. The method of claim 22, wherein determining the geographic location of the telephony device includes receiving the geographic location of the telephony device from the telephony device.

25. The method of claim 22, wherein determining the geographic location of the telephony device includes receiving the geographic location of the telephony device from a cellular telephony system.

26. The method of claim 22, wherein determining the geographic location of the telephony device includes receiving the geographic location of the telephony device from a voice over Internet protocol (VoIP) telephony system.

27. The method of claim 1, wherein determining the message for the user based on the at least one of the identification information associated with the telephony device and the current call state associated with the telephony device from among the plurality of call states is further based on a plurality of user selected menu options.

28. The method of claim 1, wherein the message is associated with one or more of an entity, a location of the entity, an item for sale by the entity, a service for sale by the entity, and a brand of at least one item for sale by the entity.

29. A system, comprising:
a processor; and
a memory medium coupled to the processor;
wherein the memory medium includes instructions, which when executed by the processor, cause the system to perform:
receiving information from a telephony device operated by a user that indicates a department of an entity;
determining a message for the user based on at least a current call state associated with the telephony device from among a plurality of call states, wherein determining the message for the user based on the at least the current call state associated with the telephony device from among the plurality of call states is further based on the information from the telephony device that indicates the department of the entity; and
sending the determined message to the telephony device.

30. A non-transitory computer readable memory medium comprising instructions, which when executed on a processing system, cause the processing system to perform:
receiving identification information associated with a telephony device operated by a user;
receiving information from the telephony device that indicates a department of an entity;
querying, based on the identification information associated with the telephony device, a database for profile information of the user;
building a menu that includes a plurality of menu options and a plurality of cross faded media, wherein at least one of the plurality of cross faded media includes at least one of the plurality of menu options, and wherein the plurality of menu options are based on the identification information associated with the telephony device and the profile information;
providing the menu to the telephony device;
receiving, from the telephony device, user input information indicating one or more selections from the plurality of menu options;
determining a message for the user based on the user input information indicating the one or more selections from the plurality of menu options, wherein determining the message for the user based on the user input information indicating the one or more selections from the plurality of menu options is further based on the information from the telephony device that indicates the department of the entity; and
sending the determined message to the telephony device.

31. The non-transitory computer readable memory medium of claim 30, wherein the memory medium further includes instructions, which when executed on the processing system, cause the processing system to perform:
sending a proffer for the message to the telephony device; and
receiving, from the telephony device, user input information indicating a request for or an acceptance of the message;
wherein sending the message to the telephony device is performed in response to receiving, from the telephony device, the user input information indicating the request for or the acceptance of the message.

* * * * *